(12) United States Patent
Okazaki et al.

(10) Patent No.: US 9,957,399 B2
(45) Date of Patent: May 1, 2018

(54) AQUEOUS INK, INK CARTRIDGE, AND INK JET RECORDING METHOD

(71) Applicant: CANON KABUSHIKI KAISHA, Tokyo (JP)

(72) Inventors: Shuichi Okazaki, Fujisawa (JP); Kouhei Nakagawa, Tokyo (JP); Hiroshi Kakikawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/992,216

(22) Filed: Jan. 11, 2016

(65) Prior Publication Data
US 2016/0215153 A1    Jul. 28, 2016

(30) Foreign Application Priority Data

Jan. 23, 2015   (JP) ................................. 2015-011095

(51) Int. Cl.
*C09D 11/322* (2014.01)
*C09D 11/02* (2014.01)
(Continued)

(52) U.S. Cl.
CPC ............ *C09D 11/322* (2013.01); *C09D 11/00* (2013.01); *C09D 11/02* (2013.01); *C09D 11/102* (2013.01);
(Continued)

(58) Field of Classification Search
None
See application file for complete search history.

(56) References Cited

U.S. PATENT DOCUMENTS 7,381,257 B2   6/2008   Takayama et al.
7,705,071 B2   4/2010   Nakagawa et al.
(Continued)

FOREIGN PATENT DOCUMENTS

EP   2 270 109 A1   1/2011
JP   2004-155830 A   6/2004
(Continued)

OTHER PUBLICATIONS

Jun. 14, 2016 European Search Report in European Patent Appln. No. 16000054.3.

*Primary Examiner* — An Do
*Assistant Examiner* — Renne I Wilson
(74) *Attorney, Agent, or Firm* — Fitzpatrick, Cella, Harper & Scinto

(57) ABSTRACT

An ink jet aqueous ink including a pigment; a resin dispersant; a fluorinated surfactant; and a water-soluble organic solvent. The pigment comprises quinacridone pigments comprising C.I. Pigment Violet 19, Red 122, 202 or 209; solid solution pigments of two or more thereof; diketopyrrolopyrrole pigments comprising C.I. Pigment Red 254, 255 or 272; or C.I. Pigment Violet 23. The dispersant has an acid value of 150-200 mg KOH/g. The surfactant comprise a perfluoroalkyl ethylene oxide adduct having a C6 or lower perfluoroalkyl group. The solvent contains a water-soluble organic solvent A and B having a dielectric constant of 40.0 or more and 3.0-20.0, respectively. Content p of the pigment is 5.00 mass % or less. Content a of solvent A to content p is 2.0 or more. Content b of solvent B to content a is 0.6 or less. Content b to content f of the surfactant is 10.0 or more.

20 Claims, 2 Drawing Sheets

(51) Int. Cl.
*C09D 11/38* (2014.01)
*C09D 11/102* (2014.01)
*C09D 11/30* (2014.01)
*B41J 2/00* (2006.01)
*C09D 11/00* (2014.01)

(52) U.S. Cl.
CPC .............. *C09D 11/30* (2013.01); *C09D 11/38* (2013.01); *B41J 2/00* (2013.01)

(56) References Cited

U.S. PATENT DOCUMENTS

| | | |
|---|---|---|
| 7,854,798 B2 | 12/2010 | Udagawa et al. |
| 8,093,311 B2 | 1/2012 | Noguchi et al. |
| 8,435,339 B2 | 5/2013 | Koyano et al. |
| 8,834,621 B2 | 9/2014 | Takebayashi et al. |
| 8,876,962 B2 | 11/2014 | Yamamoto et al. |
| 8,987,348 B2 | 3/2015 | Mukae et al. |
| 9,187,662 B2 | 11/2015 | Yamamoto et al. |
| 2006/0205839 A1 | 9/2006 | Noguchi et al. |
| 2006/0260505 A1 | 11/2006 | Ham et al. |
| 2010/0196601 A1* | 8/2010 | Goto .................... B41M 5/0023 427/256 |
| 2013/0053485 A1* | 2/2013 | Misawa ................ C09D 11/324 524/104 |
| 2013/0328973 A1 | 12/2013 | Kakikawa et al. |

FOREIGN PATENT DOCUMENTS

| | | |
|---|---|---|
| JP | 2005-112872 A | 4/2005 |
| JP | 2006-249203 A | 9/2006 |
| JP | 2008-266363 A | 11/2008 |
| JP | 2012-184376 A | 9/2012 |

* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

In recent years, inks containing pigments (pigment inks) as coloring materials have been widely used as the inks used for the ink jet recording method. In order to give glossy images such as photographs, an ink containing a resin-dispersed pigment in which a pigment is dispersed by a resin (resin dispersant) is typically used. If the ink containing the resin-dispersed pigment is used, highly tough images can be recorded because the pigment is present in the form of particles in the ink. However, the images recorded with the pigment inks unfortunately have lower gloss clarity than those of images recorded with dye inks in which dyes are dissolved in an aqueous medium. The "gloss clarity" is an indicator of the image characteristics commonly used for evaluating glossy images and an indicator of clearness and distinctness of an image recorded on the surface of a recording medium.

To solve that problem, various techniques have been disclosed. In one of the techniques, a silicone-containing surfactant or a fluorinated surfactant is added to lower the surface tension of an ink, and thus the wettability and permeability of the ink to a recording medium is improved. For example, an ink containing a silicone-containing surfactant or a fluorinated surfactant has been disclosed. The ink enables recording of images having excellent uniformity, void resistance, glossiness, and scratch resistance (Japanese Patent Application Laid-Open No. 2012-184376).

Moreover, by combining the three primary color inks with other inks than the three primary color inks (particular color inks), such as a red ink, a green ink, a blue ink, an orange ink, and a violet ink, the expansion of the color reproduction region of images have been studied. For example, an ink set including a red ink containing C.I. Pigment Red 254 (Japanese Patent Application Laid-Open No. 2004-155830) and a blue ink containing C.I. Pigment Violet (Japanese Patent Application Laid-Open No. 2005-112872) have been disclosed.

Meanwhile, aqueous inks may freeze depending on usage environments or transportation conditions of ink jet recording apparatuses, but the pigments are required to be stably dispersed even after melting. As an example of inks which can suppress freezing, an ink containing predetermined amounts of polyethylene glycol and diethylene glycol has been disclosed (Japanese Patent Application Laid-Open No. 2006-249203).

SUMMARY OF THE INVENTION

The inventors of the present invention have studied inks containing a particular pigment such as a quinacridone pigment, a quinacridone solid solution pigment, a diketopyrrolopyrrole pigment, or C.I. Pigment Violet 23 and a fluorinated surfactant. The result has revealed that when the ink is used, the gloss clarity of the images recorded on glossy papers deteriorates in some cases. The result has further revealed that when the ink is frozen, the pigment aggregates after melting. In addition, it has been revealed that even when polyethylene glycol and diethylene glycol are added, as disclosed in Japanese Patent Application Laid-Open No. 2006-249203, to the ink containing the particular pigment, the pigment aggregates after freezing.

An object of the present invention is to provide an aqueous ink that enables recording of images having excellent gloss clarity and contains a pigment prevented from aggregating even after freezing. Another object of the present invention is to provide an ink cartridge and an ink jet recording method using the aqueous ink.

The above object is achieved by the following present invention. The present invention provides an aqueous ink for ink jet including a pigment, a resin dispersant for dispersing the pigment, a fluorinated surfactant, and a water-soluble organic solvent. In the aqueous ink, the pigment is at least one pigment selected from the group consisting of quinacridone pigments, quinacridone solid solution pigments formed from two or more of the quinacridone pigments, diketopyrrolopyrrole pigments, and C.I. Pigment Violet 23; the quinacridone pigment is at least one pigment selected from the group consisting of C.I. Pigment Violet 19, C.I. Pigment Red 122, C.I. Pigment Red 202, and C.I. Pigment Red 209; and the diketopyrrolopyrrole pigment is at least one pigment selected from the group consisting of C.I. Pigment Red 254, C.I. Pigment Red 255, and C.I. Pigment Red 272. The resin dispersant has an acid value of 150 mg KOH/g or more to 200 mg KOH/g or less; the fluorinated surfactant is a perfluoroalkyl ethylene oxide adduct having a perfluoroalkyl group with six or less carbon atoms; and the water-soluble organic solvent contains a water-soluble organic solvent A having a dielectric constant of 40.0 or more and a water-soluble organic solvent B having a dielectric constant of 3.0 or more to 20.0 or less. A content p (% by mass) of the pigment is 5.00% by mass or less; a content a (% by mass) of the water-soluble organic solvent A relative to the content p (% by mass) of the pigment is 2.0 times or more in terms of ratio; a content b (% by mass) of the water-soluble organic solvent B relative to the content a (% by mass) of the water-soluble organic solvent A is 0.6 times or less in terms of mass ratio, and the content b (% by mass) of the water-soluble organic solvent B relative to a content f (% by mass) of the fluorinated surfactant is 10.0 times or more in terms of mass ratio.

According to the present invention, an aqueous ink that enables recording of images having excellent gloss clarity and contains a pigment prevented from aggregating even after freezing can be provided. According to the present invention, an ink cartridge and an ink jet recording method using the aqueous ink can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
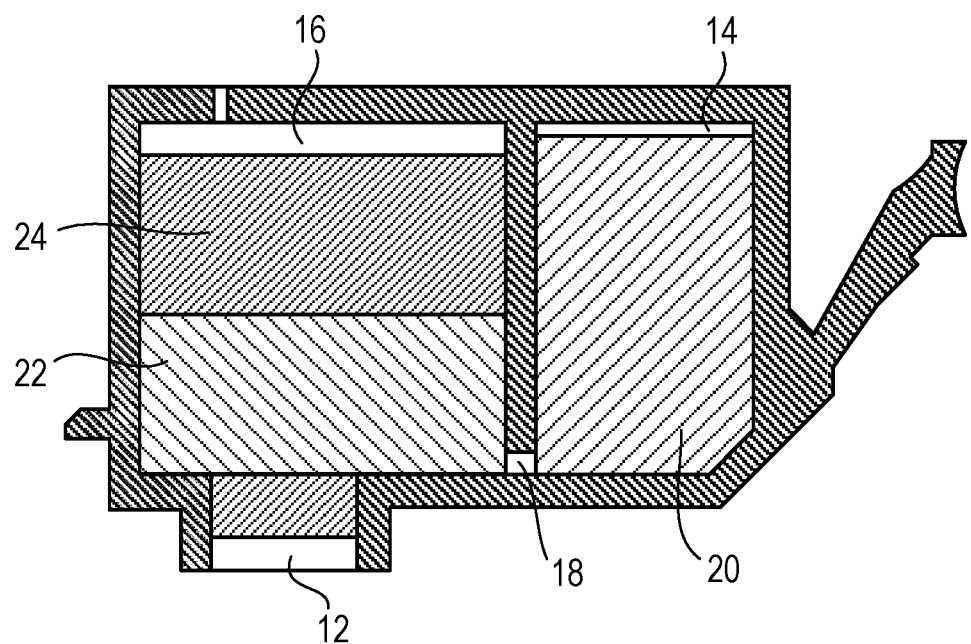
FIG. 1 is a schematic sectional view illustrating an ink cartridge according to an embodiment of the present invention.

The present invention will now be described in detail with reference to preferred embodiments. An aqueous ink for ink jet is also simply called "ink". Various physical property values in the present invention are the values determined at 25° C. unless otherwise noted.

The organic pigments shown below (hereinafter also collectively referred to as "particular pigment") have a highly planar molecular structure and a highly hydrophilic particle surface. On this account, in order to stably disperse these particular pigments in an aqueous ink, a resin dispersant having a comparatively high acid value is required to be used. Specifically, a resin dispersant having an acid value of 150 mg KOH/g or more to 200 mg KOH/g or less is required to be used.

[Particular Pigment]

Quinacridone pigments: C.I. Pigment Violet 19, C.I. Pigment Red 122, C.I. Pigment Red 202, C.I. Pigment Red 209

Quinacridone solid solution pigments formed from two or more of the above quinacridone pigments Diketopyrrolopyrrole pigments: C.I. Pigment Red 254, C.I. Pigment Red 255, C.I. Pigment Red 272

C.I. Pigment Violet 23

To record images having excellent gloss clarity by using pigment inks, both the wettability and the permeability of the inks with respect to a recording medium are required to be improved. It is generally understood that both the wettability and the permeability can be improved by reducing the surface tension of an ink. Hence, the inventors of the present invention have added a fluorinated surfactant to an ink containing a resin-dispersed pigment to try to improve the wettability and the permeability of the ink. It has been revealed, however, that even when the fluorinated surfactant is added to the ink containing the particular pigment, the gloss clarity of images is not improved in some cases. By the ink jet recording method, a plurality of dots overlap with each other to record an image, and thus the surface energy of dots applied to a recording medium is supposed to affect the gloss clarity. When applied to a recording medium, the fluorinated surfactant, which has a highly hydrophobic moiety, is unevenly distributed on the surface of dots and reduces the surface energy. The surface is thus unlikely to be wetted by dots subsequently applied. Accordingly, the subsequently applied dots are likely to be repelled, and the dots overlap unevenly. This fails to give the smoothness of the image after fixing, and thus the gloss clarity is supposed to deteriorate.

It has been also revealed that if a water-soluble organic solvent (hereinafter also referred to as "water-soluble organic solvent B") having a dielectric constant of 3.0 or more to 20.0 or less is added together with a fluorinated surfactant to an ink, the uneven distribution of the fluorinated surfactant on the surface of dots is reduced, and the gloss clarity of images are improved. The ink containing the water-soluble organic solvent B, however, causes such a new problem that the pigment aggregates after the ink is frozen. When the aqueous ink containing the water-soluble organic solvent freezes, water freezes into ice first. Water crystallizes due to the hydrogen-bonding strength of water molecules, and thus the ink becomes in such a state as to extrude components other than the water from the ice portion. On this account, components other than the water, such as water-soluble organic solvents, pigments, and surfactants are present at high concentrations in the portion other than the ice portion.

The result of this study has revealed that when the ink containing the particular pigment is once frozen and then melted, the pigment has a larger particle size and the gloss clarity of images deteriorate. It has been also revealed that the cause is that the dispersion state of the pigment becomes unstable when components other than water are concentrated by freezing and the pigment aggregates to increase the particle size. A pigment having a larger particle size deteriorates the gloss clarity of images. Such a phenomenon has been markedly observed when the particular pigments, specifically, C.I. Pigment Red 202; C.I. Pigment Red 209; a quinacridone solid solution pigment formed from at least one of C.I. Pigment Red 202 and C.I. Pigment Red 209; C.I. Pigment Red 254; and C.I. Pigment Violet 23 are used. These organic pigments have a molecular structure containing a chlorine atom, which is an electron withdrawing group. It is thus supposed that the pigments are strongly stacked with each other and the cohesive power increases when the dispersion state becomes unstable.

As described above, in order to stably disperse the particular pigments in an aqueous medium, a resin dispersant having a comparatively high acid value is required to be used. However, when a resin dispersant having a high acid value is used to disperse a pigment, the hydrophobic interaction between the resin dispersant and the pigment does not become so high in an aqueous medium. When a water-soluble organic solvent and the pigment are concentrated by freezing, the resin dispersant is released from the pigment by the water-soluble organic solvent. On this account, it is supposed that the dispersion state of the pigment becomes unstable after freezing to cause aggregation of the pigment. In other words, coexistence of such a particular pigment, the fluorinated surfactant, and the water-soluble organic solvent B destabilizes the dispersion state of the pigment, and such a problem that the pigment is likely to aggregate after freezing is supposed to be peculiarly caused.

As described above, in a pigment ink containing the organic pigment that has a highly hydrophilic particle surface and a highly planar molecular structure, the improvement of the gloss clarity and the aggregation suppression after freezing are in an incompatible relation and are difficult to be achieved simultaneously. To address this, the inventors of the present invention have studied the reason why the dispersion state of the pigment becomes unstable after freezing. The result has revealed that a water-soluble organic solvent having a low dielectric constant destabilizes the dispersion state of the pigment. This suggests that in order to stably disperse the pigment after freezing, it is helpful to use a water-soluble organic solvent having a high dielectric constant and not to impair electrostatic repulsion by an anionic group of the resin dispersant. However, when only the water-soluble organic solvent having a high dielectric constant is used, the fluorinated surfactant is markedly unevenly distributed, and thus the gloss clarity of images is likely to deteriorate.

Based on the above findings, the inventors of the present invention have found that both improvements of the gloss clarity and the aggregation suppression after freezing can be achieved by satisfying the following requirements (1) to (5).

(1) A water-soluble organic solvent A having a dielectric constant of 40.0 or more and a water-soluble organic solvent B having a dielectric constant of 3.0 or more to 20.0 or less are used.

(2) The content p (% by mass) of the pigment is 5.00% by mass or less.

(3) The content a (% by mass) of the water-soluble organic solvent A relative to the content p (% by mass) of the pigment is 2.0 times or more in terms of mass ratio.

(4) The content b (% by mass) of the water-soluble organic solvent B relative to the content a (% by mass) of the water-soluble organic solvent A is 0.6 times or less in terms of mass ratio.

(5) The content b (% by mass) of the water-soluble organic solvent B relative to the content f (% by mass) of the fluorinated surfactant is 10.0 times or more in terms of mass ratio.

By the coexistence of the fluorinated surfactant and the water-soluble organic solvent B, the uneven distribution of the fluorinated surfactant can be suppressed and the gloss clarity of images can be improved. By the addition of the water-soluble organic solvent A at a certain ratio or more relative to the content of the water-soluble organic solvent B, the surface energy of dots applied to an recording medium can be reduced, and thus the gloss clarity can be further improved.

The fluorinated surfactant has high surface activating power, like the silicone-containing surfactant, and thus is known as a surfactant suited for reducing the surface tension of inks. These surfactants exhibit high surface activating power due to a large difference in hydrophilicity between a hydrophobic moiety and a hydrophilic moiety. Hence, a surfactant having high surface activating power has a hydrophobic group having extremely high hydrophobicity and thus is likely to be adsorbed onto the particle surface of a pigment due to hydrophobic interaction.

The fluorinated surfactant very strongly attracts electrons due to high electronegativity of a fluorine atom, and thus the hydrophobic group has very week intermolecular force. Even when adsorbed onto the particle surface of a pigment, the fluorinated surfactant is easily released. On this account, if used, a smaller amount of the fluorinated surfactant can efficiently reduce the surface tension of inks and can improve the leveling properties among dots to increase the gloss clarity of images.

In contrast, the silicone-containing surfactant, which does not have such a highly electronegative atom as a fluorine atom and has strong intermolecular force, is likely to be adsorbed onto the particle surface of a pigment. On this account, if used, a larger amount of the silicone-containing surfactant is required to reduce the surface tension of inks than that of the fluorinated surfactant. Accordingly, when an ink containing the silicone-containing surfactant in place of the same amount of the fluorinated surfactant is used, the gloss clarity of images is not improved in some cases. If the silicone-containing surfactant is used to give gloss clarity comparable to that obtained by using the fluorinated surfactant, the uneven distribution of the silicone-containing surfactant is required to be suppressed. To suppress the uneven distribution, a significantly large amount of the water-soluble organic solvent B is required to be added to the silicone-containing surfactant. In such a case, the water-soluble organic solvent B is contained in an excess amount, and thus the aggregation suppression after freezing cannot be achieved.

As described above, the fluorine atom very strongly attracts electrons, and thus the van der Waals force due to the fluctuation of electrons is unlikely to be generated. On this account, fluorinated compounds such as fluorinated surfactants have weak intermolecular force. In addition, a nonionic fluorinated surfactant does not ionize in an aqueous medium and thus electrons are particularly unlikely to fluctuate. In contrast, the hydrophilic group of an ionic fluorinated surfactant ionizes in an aqueous medium and thus electrons are likely to fluctuate. On this account, the ionic fluorinated surfactant has higher intermolecular force and thus is likely to be adsorbed onto the particle surface of a pigment. In addition, a surfactant is adsorbed onto the particle surface of a pigment due to the hydrophobic interaction, and thus a fluorinated surfactant having a group with a small number of carbon atoms to which a fluorine atom is added and having comparatively weak hydrophobicity is further unlikely to be adsorbed onto the particle surface of a pigment. The aqueous ink of the present invention contains a perfluoroalkyl ethylene oxide adduct having a perfluoroalkyl group with six or less carbon atoms as the fluorinated surfactant. A perfluoroalkyl group with more than six carbon atoms has strong hydrophobicity, thus is likely to be adsorbed onto the particle surface of a pigment due to the hydrophobic interaction, and cannot suppress the deterioration of gloss clarity.

Ink

The ink of the present invention is an aqueous ink for ink jet containing a pigment, a resin dispersant for dispersing the pigment, a fluorinated surfactant, and a water-soluble organic solvent. The ink of the present invention is not required to be used in combination with a liquid that causes reaction or viscosity increases when the liquid comes in contact with the ink. Components constituting the ink of the present invention, physical properties of the ink, and the like will next be described in detail.

Pigment

The ink of the present invention contains a particular pigment as a coloring material. The particular pigment is at least one pigment selected from the group consisting of quinacridone pigments, quinacridone solid solution pigments formed from two or more of the quinacridone pigments, diketopyrrolopyrrole pigments, and C.I. Pigment Violet 23. The quinacridone pigment is at least one pigment selected from the group consisting of C.I. Pigment Violet 19, C.I. Pigment Red 122, C.I. Pigment Red 202, and C.I. Pigment Red 209. The diketopyrrolopyrrole pigment is at least one pigment selected from the group consisting of C.I. Pigment Red 254, C.I. Pigment Red 255, and C.I. Pigment Red 272.

In the ink, the content p (% by mass) of the pigment is 5.00% by mass or less, and is preferably 0.05% by mass or more and more preferably 0.10% by mass or more based on the total mass of the ink. If the content p of the pigment is more than 5.00% by mass, the solid content is excessively large, and thus the gloss clarity of images are not improved. The pigment preferably has an average primary particle size of 10 nm or more to 300 nm or less. If the pigment has an average primary particle size of less than 10 nm, the interaction between primary particles becomes high, and thus the storage stability of the ink slightly deteriorates in some cases. If the pigment has an average primary particle size of more than 300 nm, the chromaticness of images slightly deteriorates in some cases.

The ink of the present invention can contain additional pigments other than the particular pigment as necessary. The additional pigment is exemplified by inorganic pigments such as carbon black and organic pigments, which are well-known in the art.

The pigment is dispersed in the ink by a resin (resin dispersant). When such a pigment dispersed by a resin (resin-dispersed pigment) is used as the coloring material, the glossiness of images can be improved. In the present invention, the "pigment dispersed by a resin (resin-dispersed pigment)" is exemplified by the pigments described below. Specifically, the pigments in the form (1) or (2) below are preferred, and the pigments in the form (1) are more preferred.

(1) Pigments in which a resin dispersant is physically adsorbed onto the particle surface of the pigment (2) Resin-bonded self-dispersible pigments in which an organic group in a resin dispersant is chemically bonded to the particle surface of the pigments to modify the pigments (3) Microcapsule pigments coated with a resin dispersant Resin Dispersant The ink of the present invention contains a resin dispersant for dispersing the pigment in the ink. The resin dispersant is preferably a water-soluble copolymer (water-soluble resin) having two or more units derived from two or more kinds of monomers. If the resin dispersant is water-insoluble, the viscosity is likely to increase rapidly when the ink is applied to a recording medium and the water evaporates, and thus the gloss clarity of images slightly deteriorates in some cases. The resin dispersant is preferably a resin having a hydrophilic unit and a hydrophobic unit as constitution units. The resin dispersant is preferably a water-soluble acrylic resin at least having a unit that has a (meth)acrylic structure derived from (meth)acrylic acid or a (meth)acrylate ester. In the below description, "(meth) acrylic" means "acrylic" and "methacrylic", and "(meth) acrylate" means "acrylate" and "methacrylate".

The hydrophilic unit (a unit having a hydrophilic group such as an acidic group or a hydroxy group) can be formed by polymerizing a monomer having a hydrophilic group, for example. Specific examples of the monomer having a hydrophilic group include anionic monomers including acidic monomers having a carboxy group, such as (meth)acrylic acid, itaconic acid, maleic acid, and fumaric acid and anhydrides and salts of these acidic monomers; monomers having a hydroxy group, such as 2-hydroxyethyl (meth) acrylate and 3-hydroxypropyl (meth)acrylate; and monomers having an ethylene oxide group, such as methoxy (mono, di, tri, and poly)ethylene glycol (meth)acrylates.

Examples of the cation constituting the salt of an acidic monomer include a lithium ion, a sodium ion, a potassium ion, an ammonium ion, and organic ammonium ions. The resin dispersant used in the ink of the present invention has an acid value and thus the hydrophilic unit contains a unit derived from the above-mentioned anionic monomer. The resin dispersant typically exhibits water-solubility when being neutralized with a neutralizer such as hydroxides of alkali metals (for example, lithium, sodium, and potassium) and aqueous ammonia.

The hydrophobic unit (a unit not having a hydrophilic group such as an acidic group or a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso) propyl (meth)acrylate, (n-, iso-, t-)butyl (meth)acrylates, and 2-ethylhexyl (meth)acrylate (i.e., (meth)acrylate monomers).

The resin dispersant preferably has a unit derived from (meth)acrylic acid as the hydrophilic unit and also preferably has a unit derived from a monomer having an aliphatic group or an aromatic ring as the hydrophobic unit. The resin dispersant more preferably has a unit derived from methacrylic acid as the hydrophilic unit and also more preferably has a unit derived from at least one monomer of styrene and α-methylstyrene as the hydrophobic unit. Such a resin dispersant is likely to interact particularly with the pigment and thus is preferred.

The resin dispersant may have any molecular structure and have any one of a linear structure, a branched structure, a random copolymer structure, and a block copolymer structure.

Whether the pigment is dispersed by the resin and the type of the resin dispersing a pigment in an ink that contains a plurality kinds of resins can be determined by the following procedure. An ink is concentrated or diluted to prepare a liquid having a total solid content of about 10% by mass. The prepared liquid is centrifuged at 12,000 rpm for 1 hour. By the centrifugation, a liquid layer containing a water-soluble organic solvent, resins not contributing the dispersion, and the like is separated from a precipitate including the pigment, and the precipitate is taken out. The resin contained in the precipitate taken out in this manner is recognized as the resin dispersing the pigment. In other words, the resin contained as the main component in the precipitate is the resin contributing the dispersion of the pigment (resin dispersant). Meanwhile, the resin contained as the main component in the liquid layer is a resin not contributing the dispersion of the pigment.

Whether the acrylic resin or the urethane resin is water-soluble is determined by the following procedure. First, by neutralization with an alkali (such as sodium hydroxide and potassium hydroxide) in an amount corresponding to the acid value, a liquid containing a resin (resin solid content: 10% by mass) is prepared. Next, the prepared liquid is diluted 10-fold (in terms of volume) with pure water to prepare a sample solution. The particle size of the resin in the sample solution is then determined by dynamic light scattering. When the particles having particle sizes are not observed, such a resin can be recognized to be water-soluble. The conditions for the measurement are as follows.

Measurement Conditions

Set-Zero: 30 seconds

Number of measurements: three times

Measurement time: 180 seconds

As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

The resin dispersant has an acid value of 150 mg KOH/g or more to 200 mg KOH/g or less. The particular pigment used in the ink of the present invention has high hydrophilicity. On this account, if having an acid value of less than 150 mg KOH/g, the resin dispersant interacts weakly with the pigment, giving insufficient effect of the aggregation suppression after freezing. In addition, the resin dispersant is likely to aggregate to lower the leveling properties, and the gloss clarity of images deteriorates in some cases. If the resin dispersant has an acid value of more than 200 mg KOH/g, the resin dispersant has excessively high solubility for water, and the interaction with the pigment becomes weak. This results in insufficient effect of the aggregation suppression after freezing. The acid value of the resin dispersant can be determined by potentiometric titration.

The resin dispersant preferably has a weight-average molecular weight Mw of 1,000 or more to 30,000 or less and more preferably 3,000 or more to 15,000 or less. The resin dispersant preferably has a polydispersity (ratio Mw/Mn of weight-average molecular weight Mw and number-average molecular weight Mn) of 1.0 or more to 3.0 or less. The weight-average molecular weight Mw, the number-average molecular weight Mn, and the polydispersity Mw/Mn of the resin dispersant can be determined by size exclusion chromatography (GPC method) in accordance with JIS Handbook, Chemical analysis K0124.

In the ink, the content d (% by mass) of the resin dispersant is preferably 0.01% by mass or more to 5.00% by mass or less, and more preferably 0.02% by mass or more to 3.00% by mass or less based on the total mass of the ink. In the ink, the content p (% by mass) of the pigment relative to the content d (% by mass) of the resin dispersant is preferably 1.1 times or more to 10.0 times or less in terms of mass ratio. When the mass ratio is within this range, the pigment can be stably dispersed in the ink even after freezing. If the mass ratio (p/d) is more than 10.0 times, the resin dispersant is contained in a relatively small amount and is difficult to stably disperse the pigment, and the effect of the aggregation suppression after freezing is reduced in some cases. If the mass ratio (p/d) is less than 1.1 times, the resin dispersant is contained in a relatively large amount, and the gloss clarity of images deteriorates in some cases.

Fluorinated Surfactant

The ink of the present invention contains a fluorinated surfactant. The fluorinated surfactant is a perfluoroalkyl ethylene oxide adduct having a perfluoroalkyl group with six or less carbon atoms. The number of carbon atoms of the perfluoroalkyl group is preferably two or more and more preferably four or more. As such a fluorinated surfactant, a commercial product can be used. Specific examples of the nonionic fluorinated surfactant include commercial products available under the trade names, MEGAFACE F-470 and F-444 (manufactured by DIC Co.); Surflon S-141 and S-145 (manufactured by Asahi Glass Co.): and Zonyl FS-3100 (manufactured by Du Pont Co.). If the perfluoroalkyl ethylene oxide adduct has a branched molecular structure, the difference in polarity between the perfluoroalkyl group, which is the hydrophobic moiety, and the ethylene oxide group, which is the hydrophilic moiety, becomes large. Such a perfluoroalkyl ethylene oxide adduct has a larger intermolecular force and is likely to be adsorbed onto the particle surface of a pigment. Hence, a linear perfluoroalkyl ethylene oxide adduct is more preferably used.

In the ink, the content f (% by mass) of the fluorinated surfactant is preferably 0.01% by mass or more to 0.20% by mass or less based on the total mass of the ink. When the content is within this range, the ink is likely to have a static surface tension γ of 30 mN/m or less, which is determined by plate method at 25° C., and thus the gloss clarity of images can be efficiently improved.

Water-Soluble Organic Solvent A

The ink of the present invention contains a water-soluble organic solvent A having a dielectric constant at 25° C. of 40.0 or more. Specific examples of the water-soluble organic solvent A include urea (110.3), ethylene urea (49.7), glycerol (42.3), and ethylene glycol (40.4) (values in the parentheses represent dielectric constants at 25° C.). In the ink, the content a (% by mass) of the water-soluble organic solvent A is preferably 0.10% by mass or more to 50.00% by mass or less, and more preferably 1.00% by mass or more to 20.00% by mass or less based on the total mass of the ink.

The content a (% by mass) of the water-soluble organic solvent A relative to the content p (% by mass) of the pigment is 2.0 times or more in terms of mass ratio. The mass ratio is preferably 200.0 times or less, more preferably 100.0 times or less, particularly preferably 50.0 times or less, and specifically preferably 30.0 times or less. When the mass ratio (a/p) is 2.0 times or more, the dispersion state of the pigment is stably maintained and the aggregation can be suppressed even in a condition where the pigment or the water-soluble organic solvent is concentrated after freezing. The dispersion state of the pigment is stably maintained mainly due to electrostatic repulsion by an anionic group of the resin dispersant. The water-soluble organic solvent A having a high dielectric constant is likely to maintain an ionized anionic group of the resin dispersant. Accordingly, it is assumed that by adjusting the mass ratio (a/p) to 2.0 or more, the dispersion state of the pigment is stably maintained and the aggregation is suppressed. If the mass ratio (a/p) is less than 2.0, the electrostatic repulsion by the anionic group of the resin dispersant is reduced, and the water-soluble organic solvent B described later destabilizes the dispersion state of the pigment. Accordingly, the aggregation of the pigment after freezing cannot be suppressed, and the gloss clarity of images becomes insufficient.

Water-Soluble Organic Solvent B

The ink of the present invention contains a water-soluble organic solvent B having a dielectric constant at 25° C. of 3.0 or more to 20.0 or less. Specific examples of the water-soluble organic solvent B include polyethylene glycol having a number-average molecular weight of 200 (18.9), 1,2-hexanediol (14.8), n-propyl alcohol (12.0), polyethylene glycol having a number-average molecular weight of 600 (11.4), triethylene glycol monobutyl ether (9.8), tetraethylene glycol monobutyl ether (9.4), 1,6-hexanediol (7.1), and polyethylene glycol having a number-average molecular weight of 1,000 (4.6) (values in the parentheses represent dielectric constants at 25° C.) In the ink, the content b (% by mass) of the water-soluble organic solvent B is preferably 0.10% by mass or more to 30.00% by mass or less, and more preferably 1.00% by mass or more to 15.00% by mass or less based on the total mass of the ink.

The content b (% by mass) of the water-soluble organic solvent B relative to the content a (% by mass) of the water-soluble organic solvent A is 0.6 times or less and preferably 0.5 times or less in terms of mass ratio. The mass ratio is preferably 0.1 times or more. If the mass ratio (b/a) is more than 0.6 times, the electrostatic repulsion by the anionic group of the resin dispersant is impaired. Accordingly, the aggregation of the pigment after freezing cannot be suppressed, and the gloss clarity of images deteriorates in some cases.

The water-soluble organic solvent B can effectively disperse the fluorinated surfactant having a strong hydrophobic group. This is supposed to be because the water-soluble organic solvent B, which has a low dielectric constant, solvates with the fluorinated surfactant in an aqueous medium and can stably disperse the fluorinated surfactant in the aqueous ink. The content b (% by mass) of the water-soluble organic solvent B relative to the content f (% by mass) of the fluorinated surfactant is 10.0 times or more to preferably 250.0 times or less in terms of mass ratio. If the mass ratio (b/f) is less than 10.0 times, the fluorinated surfactant cannot be stably dispersed in the ink but is unevenly distributed. Accordingly, the gloss clarity of images becomes insufficient and the effect of the aggregation suppression after freezing is reduced in some cases.

The water-soluble organic solvent B preferably contains a water-soluble organic solvent C having a dielectric constant of 3.0 or more to 10.0 or less. When the water-soluble organic solvent B contains the water-soluble organic solvent C, the fluorinated surfactant can be more effectively dispersed in the ink, and the gloss clarity can be further improved. The content c (% by mass) of the water-soluble organic solvent C relative to the content a (% by mass) of the water-soluble organic solvent A is preferably 0.2 times or less in terms of mass ratio. When the mass ratio (c/a) is 0.2 or less, the effect of the aggregation suppression after freezing can be further improved. In addition, the pigment aggregates slowly after the ink is applied to a recording medium, and the gloss clarity can be further improved. The mass ratio is preferably 0.01 times or more and more preferably 0.04 times or more. In the ink, the content c (% by mass) of the water-soluble organic solvent C is preferably 0.10% by mass or more to 15.00% by mass or less, and more preferably 0.50% by mass or more to 5.00% by mass or less based on the total mass of the ink.

The dielectric constants of water and water-soluble organic solvents can be determined by using a dielectric-constant meter (for example, trade name "BI-870", manufactured by BROOKHAVEN INSTRUMENTS CORPORATION). The dielectric constant of a water-soluble organic solvent that is solid at 25° C. can be determined by measuring the dielectric constant of 50% by mass aqueous solution and calculating the objective dielectric constant in accordance with Formula (A).

$$\varepsilon_{sol} = 2\varepsilon_{50\%} - \varepsilon_{water} \quad (A)$$

$\varepsilon_{sol}$: dielectric constant of a water-soluble organic solvent being solid at 25° C.

$\varepsilon_{50\%}$: dielectric constant of 50% by mass aqueous solution of the water-soluble organic solvent being solid at 25° C.

$\varepsilon_{water}$: dielectric constant of water

The reason why the dielectric constant of a water-soluble organic solvent being solid at 25° C. is calculated from the dielectric constant of 50% by mass aqueous solution is as follows: Some of the water-soluble organic solvents that are solid at 25° C. and usable as a component of an aqueous ink are difficult to give an aqueous solution having a high concentration of more than 50% by mass. Meanwhile, the dielectric constant of an aqueous solution having a low concentration of 10% by mass or less is dominated by the dielectric constant of water. It is thus difficult to determine the probable (practical) dielectric constant value of such a water-soluble organic solvent. Hence, the inventors of the present invention have studied and found that most of the water-soluble organic solvents that are solid at 25° C. and usable in inks can give a measurable aqueous solution and the calculated dielectric constants match with the advantageous effects of the invention. For the above reason, the dielectric constant of a water-soluble organic solvent being solid at 25° C. is intended to be calculated from the dielectric constant of 50% by mass aqueous solution in the present invention. For a water-soluble organic solvent that is solid at 25° C. but has a low solubility in water and cannot give 50% by mass aqueous solution, an aqueous solution at saturated concentration is used, and the dielectric constant is calculated in accordance with the above calculation of $\varepsilon_{sol}$ and is used expediently.

Aqueous Medium

The ink of the present invention is an aqueous ink containing an aqueous medium that is a mixed solvent of water and a water-soluble organic solvent. As the water, deionized water (ion-exchanged water) is preferably used. In the ink, the content (% by mass) of the water is preferably 10.0% by mass or more to 90.0% by mass or less based on the total mass of the ink.

As the water-soluble organic solvent, a water-soluble organic solvent (additional water-soluble organic solvent) other than the water-soluble organic solvents A, B, and C can be used in combination. The additional water-soluble organic solvent may be any water-soluble organic solvent, and can be an alcohol, a polyhydric alcohol, a polyglycol, a glycol ether, a nitrogen-containing polar solvent, or a sulfur-containing polar solvent, for example. In the ink, the content (% by mass) of the water-soluble organic solvent is preferably 3.00% by mass or more to 50.00% by mass or less and more preferably 15.00% by mass or more to 40.00% by mass or less based on the total mass of the ink. If the content of the water-soluble organic solvent is out of this range, a high level of ink ejecting stability cannot be sufficiently achieved in some cases.

The water-soluble organic solvent can be specifically exemplified by the following solvents including the above-exemplified particular water-soluble organic solvents (values in the parentheses represent dielectric constants at 25° C.). Monohydric alcohols having 1 to 4 carbon atoms, such as methyl alcohol (33.1), ethyl alcohol (23.8), n-propyl alcohol (12.0), isopropyl alcohol (18.3), n-butyl alcohol, sec-butyl alcohol, and tert-butyl alcohol. Dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol (28.3), and 3-methyl-1,5-pentanediol (23.9). Polyhydric alcohols such as 1,2,6-hexanetriol (28.5), glycerol (42.3), trimethylolpropane (33.7), and trimethylolethane. Alkylene glycols such as ethylene glycol (40.4), diethylene glycol (31.7), triethylene glycol (22.7), tetraethylene glycol (20.8), butylene glycol, hexylene glycol, and thiodiglycol. Glycol ethers such as diethylene glycol monomethyl ether, diethylene glycol monoethyl ether, triethylene glycol monoethyl ether, triethylene glycol monobutyl ether (9.8), and tetraethylene glycol monobutyl ether (9.4). Polyalkylene glycols having a number-average molecular weight of 200 to 1,000, such as polyethylene glycol having a number-average molecular weight of 600 (11.5), polyethylene glycol having a number-average molecular weight of 1,000 (4.6), and polypropylene glycol. Nitrogen-containing compounds such as 2-pyrrolidone (28.0), N-methyl-2-pyrrolidone (32.0), 1,3-dimethyl-2-imidazolidinone, N-methylmorpholine, urea (110.3), ethylene urea (49.7), and triethanolamine (31.9). Sulfur-containing compounds such as dimethyl sulfoxide (48.9) and bis(2-hydroxyethyl sulfone). As the water-soluble organic solvent contained in the ink, a water-soluble organic solvent having a dielectric constant of 3.0 or more but 120.0 or less and having a lower vapor pressure at 25° C. than that of water is preferably used.

Water-Soluble Resin

The ink of the present invention can further contain a water-soluble resin (except the water-soluble resin usable as the resin dispersant). Examples of such a water-soluble resin include copolymers of a hydrophobic monomer and a hydrophilic monomer and urethane resins. Examples of the hydrophobic monomer include styrene, methylstyrene, vinylnaphthalene, and (meth)acrylates. Examples of the hydrophilic monomer include acid monomers such as (meth)acrylic acid and maleic acid and salts thereof.

Among the water-soluble resins, the urethane resin is preferably used. When an ink containing the urethane resin is used to record an image, a pigment layer having a high surface energy derived from a urethane bond can be formed. This can improve the wettability of ink dots subsequently applied, and thus an image with more excellent gloss clarity can be recorded. In addition, when the water-soluble urethane resin is contained, the effect of the aggregation suppression after freezing can be further improved in cooperation with the function of the resin dispersant having an appropriate acid value.

Water-Soluble Acrylic Resin

As the water-soluble resin (except the water-soluble resin usable as the resin dispersant), a water-soluble acrylic resin (hereinafter also simply referred to as "acrylic resin") is preferably used. As the acrylic resin, any one of the water-soluble acrylic resins used in conventional inks for ink jet can be preferably used. Specifically preferred is an acrylic resin prepared by copolymerizing a hydrophilic monomer and a hydrophobic monomer.

Examples of the hydrophilic monomer include acid monomers and salts thereof; and compounds having a nonionic hydrophilic group such as a hydroxy group and an amido group. Specific examples of the acid monomer and salts thereof include unsaturated carboxylic acids such as (meth)acrylic acid, maleic acid, itaconic acid, and fumaric acid; derivatives thereof; and salts thereof. Specifically preferred are (meth)acrylic acid and salts thereof. Examples of the salt include alkali metal salts such as a lithium salt, a sodium salt, and a potassium salt; an ammonium salt; and organic ammonium salts. Specifically preferred are a sodium salt and a potassium salt.

Specific examples of the compound having a nonionic hydrophilic group include hydroxyalkyl (meth)acrylates such as 2-hydroxyethyl (meth)acrylate and 3-methyl-5-hydroxypentyl (meth)acrylate; mono(meth)acrylates of polyhydric alcohols, such as ethylene glycol (meth)acrylate and polyethylene glycol (meth)acrylate; (meth)acrylates to which ethylene oxide is added, such as methoxyethylene glycol (meth)acrylate, alkoxy polyalkylene glycol (meth) acrylate, and 2-phenoxyethylene glycol (meth)acrylate; and (meth)acrylamide compounds such as methyl(meth)acrylamide and ethyl(meth)acrylamide.

Examples of the hydrophobic monomer include α,β-ethylenically unsaturated compounds having an aryl group such as a phenyl group, a benzyl group, a tolyl group, an o-xylyl group, and a naphthyl group; and alkyl (meth) acrylates. Specific examples of the α,β-ethylenically unsaturated compound having an aryl group include aromatic vinyl compounds such as styrene and α-methylstyrene; ester compounds synthesized from an α,β-ethylenically unsaturated carboxylic acid and an alkyl alcohol having an aryl group, such as benzyl (meth)acrylate and 2-phenoxyethyl (meth) acrylate. Specifically preferred are styrene and α-methylstyrene. Specific example of the alkyl (meth)acrylate include methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, 2-ethylhexyl (meth)acrylate, lauryl (meth)acrylate, cyclohexyl (meth)acrylate, isobornyl (meth)acrylate, and tricyclodecanedimethanol di(meth)acrylate.

The water-soluble acrylic resin may be any one of a random copolymer, a block copolymer, a graft copolymer, and a gradient copolymer. The water-soluble acrylic resin preferably has a weight-average molecular weight of 1,000 or more to 30,000 or less, and more preferably 3,000 or more to 15,000 or less. In the ink, the content (% by mass) of the water-soluble acrylic resin is preferably 0.50% by mass or more to 4.00% by mass or less based on the total mass of the ink. The water-soluble acrylic resin preferably has an acid value of 100 mg KOH/g or more to 300 mg KOH/g or less.

Water-Soluble Urethane Resin

As the water-soluble resin (except the water-soluble resin usable as the resin dispersant), a water-soluble urethane resin (hereinafter also simply referred to as "urethane resin") is also preferably used. As described above, by adding the water-soluble urethane resin to the ink, images with more excellent gloss clarity can be recorded and the effect of the aggregation suppression after freezing can be further improved. The urethane resin is preferably "water-soluble". The inventors of the present invention have studied an ink containing urethane microparticles in place of the water-soluble urethane resin. The result has revealed that the effect of further improving the gloss clarity is insufficiently achieved. This is supposed to be because the urethane resin formulated in a microparticle form fails to form a pigment layer having a high surface energy. In the ink, the content (% by mass) of the water-soluble urethane resin is preferably 0.10% by mass or more to 3.00% by mass or less, and more preferably 0.50% by mass or more to 1.50% by mass or less based on the total mass of the ink.

The water-soluble urethane resin preferably has a weight-average molecular weight of 8,000 or more to 22,000 or less. If having a weight-average molecular weight of less than 8,000, the urethane resin permeates the inside of a pigment layer, and thus it is difficult to form a pigment layer having a high surface energy. Accordingly, the gloss clarity deteriorates in some cases. If having a weight-average molecular weight of more than 22,000, the urethane resin aggregates, and the viscosity of the ink is likely to increase. Accordingly, unevenness is formed on images, and the gloss clarity deteriorates in some cases.

Among the water-soluble urethane resins, a water-soluble urethane resin (polyether urethane resin) containing a poly(oxytetramethylene) structure or a poly(oxypropylene) structure is preferably used. By using such a polyether urethane resin, images with more excellent gloss clarity can be recorded. The poly(oxytetramethylene) structure or the poly(oxypropylene) structure in the polyether urethane resin interacts more strongly with the resin dispersant. This is supposed to help the polyether urethane resin to be efficiently present among the pigment particles and to enable recording of images with more excellent gloss clarity.

The water-soluble urethane resin preferably has an acid value of 45 mg KOH/g or more to 70 mg KOH/g or less. If having an acid value of less than 45 mg KOH/g, the water-soluble urethane resin has poor water-solubility and interacts weakly with the pigment or the resin dispersant, and thus the effect of the aggregation suppression after freezing is reduced in some cases. If the water-soluble urethane resin has an acid value of more than 70 mg KOH/g, the dissolution state in the ink becomes too unstable. Accordingly, the water-soluble urethane resin interacts weakly with the pigment or the resin dispersant, and the effect of the aggregation suppression after freezing is reduced in some cases.

The water-soluble urethane resin can be prepared by reacting a polyisocyanate with a polyol, for example. The water-soluble urethane resin can be prepared by further reacting a chain extender. The water-soluble urethane resin can also be a hybrid resin prepared by bonding a urethane resin to another resin.

As the polyisocyanate, an aliphatic polyisocyanate or an aromatic polyisocyanate can be used, for example. Specific examples of the aliphatic diisocyanate include polyisocyanates having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane 1,5-diisocyanate, and 3-methylpentane 1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanate methyl)cyclohexane.

Specific examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzy diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and α,α,α',α'-tetramethylxylylene diisocyanate.

As the polyol, long-chain polyols having a number-average molecular weight of about 450 to 4,000, such as polyether polyols, polyester polyols, and polycarbonate polyols; and short-chain polyols such as polyols having a hydrophilic group are usable. It is preferred to use a water-soluble urethane resin synthesized by using a polyether polyol specifically selected from the long-chain polyols. The water-soluble urethane resin synthesized by using the polyether polyol is unlikely to undergo hydrolysis and thus enables recording of images with excellent glossiness even after the ink is stored for a long period of time.

Examples of the polyether polyol include addition polymers of alkylene oxides and polyols; and glycols such as (poly)alkylene glycols. Examples of the alkylene oxide include ethylene oxide, propylene oxide, butylene oxide, and α-olefin oxides. Examples of the polyols to be subjected to addition polymerization with the alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea, and derivatives thereof; and triols such as glycerol, trimethylolpropane, 1,2,5-hexanetriol, 1,2,6-hexanetriol, pentaerythritol, trimethylol melamine and derivatives thereof, and polyoxypropylenetriol. Examples of the glycols include (poly)alkylene glycols such as hexamethylene glycol, tetramethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol, and neopentyl glycol; and ethylene glycol-propylene glycol copolymers.

Examples of the polyester polyol include acid esters. Examples of the acid component constituting the acid esters include aromatic dicarboxylic acids such as phthalic acid, naphthalenedicarboxylic acid, biphenyldicarboxylic acid, and tetrahydrophthalic acid; alicyclic dicarboxylic acids such as hydrogenated products of the aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkyl succinic acids, linoleic acid, maleic acid, fumaric acid, mesaconic acid, citraconic acid, and itaconic acid. Anhydrides, salts, and derivatives (including alkyl esters and acid halides) thereof are also usable as the acid component, for example. Examples of the component to form an ester with the acid component include polyols such as diols and triols; and glycols such as (poly)alkylene glycols. Examples of the polyols and the glycols include those exemplified as the components constituting the above polyether polyol.

As the polycarbonate polyol, a polycarbonate polyol produced by a known method can be used. Specific examples of the polycarbonate polyol include alkane diol polycarbonate diols such as polyhexamethylene carbonate diol. Other examples include polycarbonate diols prepared by reacting a carbonate component such as alkylene carbonates, diaryl carbonates, and dialkyl carbonates or phosgene with an aliphatic diol component.

Examples of the polyol having a hydrophilic group as a specific example of the short-chain polyol include polyols having an acid group such as a carboxy group, a sulfonic acid group, and a phosphonic acid group; and polyols having a hydrophilic group such as a carbonyl group and a hydroxy group in the structure thereof. It is particularly preferred to use a water-soluble urethane resin synthesized by further using a polyol having an acid group, such as dimethylolpropionic acid and dimethylolbutanoic acid in addition to the long-chain polyol. The acid group may be a salt form.

Examples of the cation constituting the salt include a lithium ion, a sodium ion, a potassium ion, an ammonium ion, and organic ammonium ions.

The chain extender is a compound capable of reacting with a remaining isocyanate group that fails to form a urethane bond among the polyisocyanate units in the urethane prepolymer prepared by reacting a polyisocyanate and a polyol. As the chain extender, polyvalent amines such as dimethylol ethylamine, ethylenediamine, and diethylenetriamine; polyvalent imines such as polyethylene polyimine; and polyhydric alcohols such as neopentyl glycol and butylethylpropanediol are usable. Specifically, the polyhydric alcohol is preferably used as the chain extender. When the water-soluble urethane resin synthesized by using the polyhydric alcohol as the chain extender is used, the glossiness of images can be effectively improved. Among the polyhydric alcohols, neopentyl glycol is particularly preferred.

Other Additives

The ink of the present invention can contain various additives such as pH adjusters, anticorrosives, antiseptic agents, antifungal agents, antioxidants, reduction inhibitors, evaporation accelerators, chelating agents, and additional resins, as necessary, in addition to the above-mentioned components. However, if a solid component such as wax particles (e.g. polyolefin particles) is contained, the gloss clarity of images slightly deteriorates in some cases, and thus the ink preferably does not contain such a solid component. The ink of the present invention can also contain common surfactants other than the above-mentioned fluorinated surfactant. Such an additive is typically contained at a considerably small content in the ink and thus has a small influence on the advantageous effect of the invention. On this account, such an additive is not included in the "water-soluble organic solvent" in the present invention and is eliminated from the calculation of the dielectric constant.

Surface Tension of Ink

The ink preferably has a static surface tension of 25 mN/m or more and preferably has a static surface tension of 30 mN/m or less. The static surface tension is a value determined by plate method at 25° C.

Ink Cartridge

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
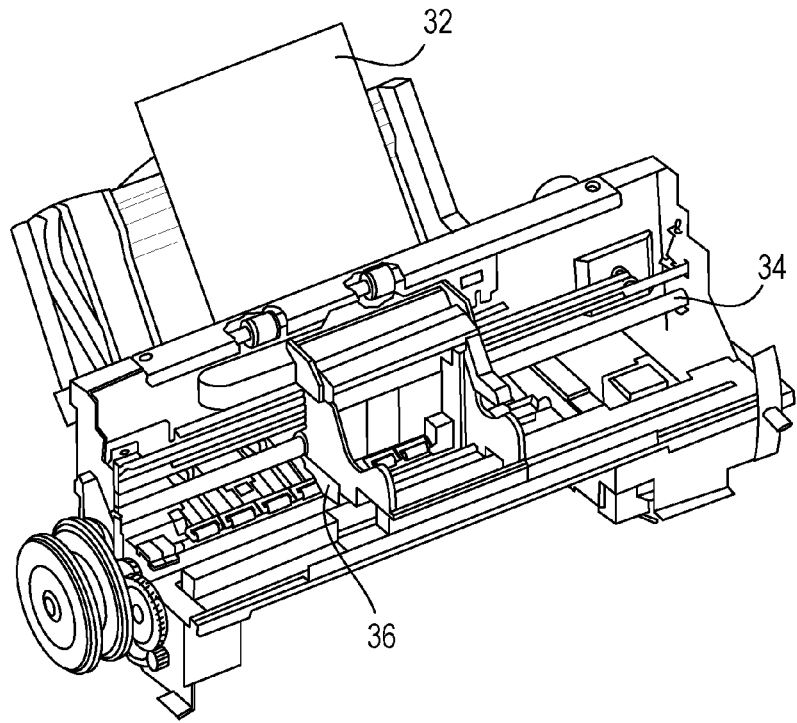
FIGS. 2A and 2B are schematic views illustrating an exemplary ink jet recording apparatus used for an ink jet recording method of the present invention.
Figure 2B:
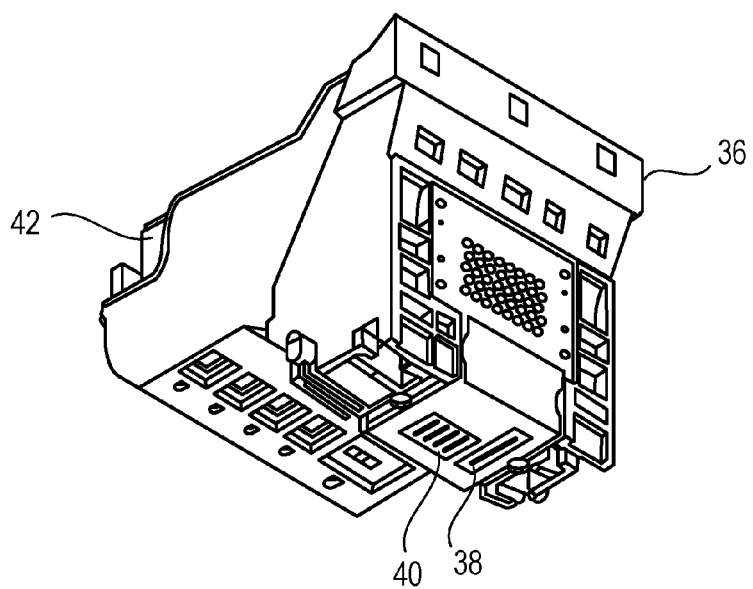

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be recorded by using the ink of the present invention may be any recording medium but is preferably a paper having permeability, such as plain paper and recording media having a coating layer (glossy paper and art paper, for example). It is particularly preferred to use the recording medium having a coating layer that allows at least some of pigment particles in the ink to be present on the surface of the recording medium or on the vicinity thereof. Such a recording medium can be selected depending on an intended use purpose of a recorded article on which an image is recorded. Example of the recording medium include glossy papers that are suitable for giving images having glossiness of photographic image quality and art papers that take advantage of substrate textures (for example, drawing paper-like texture, canvas-like texture, and Japanese paper-like texture) in order to express preferred images such as pictures, photographs, and graphic images. Specifically, what is called a glossy paper having a glossy surface of a coating layer is particularly preferably used.

EXAMPLES

The present invention will next be described in further detail with reference to examples and comparative examples, but the invention is not intended to be limited to the following examples without departing from the scope of the invention. The amounts of components expressed with "part" or "%" are based on mass unless otherwise noted.

Synthesis of Resin Dispersant (Water-Soluble Resin)

Water-soluble acrylic resins to be used as the resin dispersant were synthesized in accordance with the procedure shown below. In a four-necked flask equipped with a stirrer, a reflux condenser, and a nitrogen inlet tube, 100.0 parts of ethylene glycol monobutyl ether was put, and a nitrogen gas was introduced into the reaction system. The content was stirred and the temperature was increased to 110° C. Next, a mixture of the monomers shown in Table 1 and 1.3 parts of t-butyl peroxide (polymerization initiator) solution in ethylene glycol monobutyl ether were added dropwise over 3 hours. After aging for 2 hours, the ethylene glycol monobutyl ether was removed under reduced pressure, giving a solid water-soluble resin. To the obtained water-soluble resin, potassium hydroxide in an amount equivalent to the acid value and an appropriate amount of ion-exchanged water were added, and the resin was neutralized and dissolved at 80° C. This operation gave an aqueous resin solution having a resin content (solid content) of 30.0%. The aqueous resin solution was diluted 30-fold (in terms of volume) with pure water to prepare a sample. The particle size of the sample was determined by dynamic light scattering with a particle size analyzer (trade name "UPA-EX150", manufactured by NIKKISO CO., LTD.) under conditions of a Set-Zero of 30 seconds, a number of measurement of three times, and a measurement time of 180 seconds. As a result, no particle size was recognized in each resin, and this revealed that each resin was water-soluble. The acid value and the weight-average molecular weight in terms of polystyrene of each resin are shown in Table 1. In the types of the monomers in Table 1, BMA represents butyl methacrylate; MA represents methyl acrylate; St represents styrene; AA represents acrylic acid; and MAA represents methacrylic acid.

TABLE 1

Synthetic conditions and characteristics of resins

| Resin number | Monomer (parts) | | | | | Resin characteristics | |
|---|---|---|---|---|---|---|---|
| | BMA | MA | St | AA | MAA | Acid value (mg KOH/g) | Weight-average molecular weight |
| 1 | 40.0 | 37.5 | | 22.5 | | 175 | 8,000 |
| 2 | 40.0 | 40.7 | | 19.3 | | 150 | 7,160 |
| 3 | | | 73.6 | | 26.4 | 175 | 8,000 |
| 4 | 40.0 | 34.3 | | 25.7 | | 200 | 8,500 |
| 5 | 40.0 | 42.0 | | 18.0 | | 140 | 7,000 |
| 6 | 40.0 | 33.0 | | 27.0 | | 210 | 8,700 |

Synthesis of Resin Dispersant (Water-Insoluble Resin)

By referring to the description of Production Example 1 in Japanese Patent Application Laid-Open No. 2008-266363, a water-insoluble polymer having an acid value of 78 mg KOH/g and a weight-average molecular weight of 74,000 was synthesized. To the obtained water-insoluble polymer, a 10.0% aqueous potassium hydroxide solution in an amount equivalent to the acid value and an appropriate amount of ion-exchanged water were added, giving an aqueous dispersion of resin 7 having a resin content (solid content) of 30.0%. The obtained aqueous dispersion was subjected to measurement by dynamic light scattering in the same manner as in the case of the aqueous solutions of the resins 1 to 6 to observe the particle size. The result revealed that the resin 7 was water-insoluble.

Preparation of Pigment Dispersion Liquid

In a batch type vertical sand mill (manufactured by Aimex Co.), 15.0 parts of pigment shown in Table 2, a liquid containing the resin (aqueous solution or aqueous dispersion of resin), ion-exchanged water, and 85 parts of 0.3-mm zirconia beads were placed and subjected to dispersion treatment for 3 hours while being cooled with water. The resulting mixture was then centrifuged to remove non-dispersed components including coarse particles. Next, the mixture was subjected to pressure filtration through a cellulose acetate filter with a pore size of 3.0 μm (manufactured by ADVANTEC Co.), giving pigment dispersion liquids 1 to 19. In Table 2, the "solid solution pigment" is a solid solution of C.I. Pigment Violet 19 and C.I. Pigment Red 202.

TABLE 2

Preparation conditions and characteristics of pigment dispersion liquids

| Pigment dispersion liquid | Pigment | Trade name (manufactured by BASF) | Resin number | Amount (parts) of liquid containing resin | Amount (parts) of ion-exchanged water | Content p (%) of pigment | Content d (%) of resin | p/d value (times) |
| --- | --- | --- | --- | --- | --- | --- | --- | --- |
| 1 | C.I. Pigment Violet 23 | Violet GA | 1 | 25.0 | 60.0 | 10.0 | 5.0 | 2.0 |
| 2 | C.I. Pigment Violet 19 | Red B NRT-796-D | 1 | 25.0 | 60.0 | 10.0 | 5.0 | 2.0 |
| 3 | C.I. Pigment Red 122 | Jet Magenta DMQ | 1 | 25.0 | 60.0 | 10.0 | 5.0 | 2.0 |
| 4 | C.I. Pigment Red 202 | Magenta RT-235-D | 1 | 25.0 | 60.0 | 10.0 | 5.0 | 2.0 |
| 5 | Solid solution pigment | Jet Magenta 2BC | 1 | 25.0 | 60.0 | 10.0 | 5.0 | 2.0 |
| 6 | C.I. Pigment Red 254 | DPP Red 2030 | 1 | 25.0 | 60.0 | 10.0 | 5.0 | 2.0 |
| 7 | C.I. Pigment Red 272 | DPP Flame Red FP | 1 | 25.0 | 60.0 | 10.0 | 5.0 | 2.0 |
| 8 | C.I. Pigment Violet 23 | Violet GA | 2 | 25.0 | 60.0 | 10.0 | 5.0 | 2.0 |
| 9 | C.I. Pigment Violet 23 | Violet GA | 3 | 25.0 | 60.0 | 10.0 | 5.0 | 2.0 |
| 10 | C.I. Pigment Violet 23 | Violet GA | 4 | 25.0 | 60.0 | 10.0 | 5.0 | 2.0 |
| 11 | C.I. Pigment Violet 23 | Violet GA | 1 | 50.0 | 35.0 | 10.0 | 10.0 | 1.0 |
| 12 | C.I. Pigment Violet 23 | Violet GA | 1 | 45.5 | 39.5 | 10.0 | 9.1 | 1.1 |
| 13 | C.I. Pigment Violet 23 | Violet GA | 1 | 5.0 | 80.0 | 10.0 | 1.0 | 10.0 |
| 14 | C.I. Pigment Violet 23 | Violet GA | 1 | 4.5 | 80.5 | 10.0 | 0.9 | 11.1 |
| 15 | C.I. Pigment Violet 23 | Violet GA | 5 | 25.0 | 60.0 | 10.0 | 5.0 | 2.0 |
| 16 | C.I. Pigment Violet 23 | Violet GA | 6 | 25.0 | 60.0 | 10.0 | 5.0 | 2.0 |
| 17 | C.I. Pigment Violet 23 | Violet GA | 7 | 25.0 | 60.0 | 10.0 | 5.0 | 2.0 |
| 18 | C.I. Pigment Blue 15:3 | Blue 8700 | 1 | 25.0 | 60.0 | 10.0 | 5.0 | 2.0 |
| 19 | C.I. Pigment Yellow 74 | Yellow GS | 1 | 25.0 | 60.0 | 10.0 | 5.0 | 2.0 |

Synthesis of Water-Soluble Urethane Resin

In a four-necked flask equipped with a thermometer, a stirrer, a nitrogen inlet tube, and a condenser, the polyol in the amount shown in Table 3, 44.5 g of isophorone diisocyanate, and 0.007 g of dibutyltin dilaurate were placed. Under a nitrogen gas atmosphere, the mixture was caused to react at a temperature of 100° C. for 5 hours and then cooled to a temperature of 65° C. or less. Dimethylolpropionic acid in the amount shown in Table 3, 3.0 g of neopentyl glycol, and 150.0 g of methyl ethyl ketone were added, and the resulting mixture was caused to react at a temperature of 80° C. Then, 20.0 g of methanol was added to stop the reaction. Next, an appropriate amount of ion-exchanged water was added, and an aqueous potassium hydroxide solution required for neutralizing the resin was added while the mixture was stirred with a homomixer. Then, the methyl ethyl ketone and the unreacted methanol were distilled off under heat and reduced pressure, giving aqueous solutions of urethane resins 1 to 11 each having a resin content (solid content) of 10.0%. The weight-average molecular weight of the urethane resin was adjusted by appropriately changing the reaction time at a temperature of 80° C. The aqueous urethane resin solution was diluted 10-fold (in terms of volume) with pure water to prepare a sample. The particle size of the sample was determined by dynamic light scattering with a particle size analyzer (trade name "UPA-EX150", manufactured by NIKKISO CO., LTD.) under conditions of a Set-Zero of 30 seconds, a number of measurements of three times, and a measurement time of 180 seconds. As a result, no particle size was recognized in each urethane resin, and this revealed that each urethane resin was water-soluble. The acid value and the weight-average molecular weight in terms of polystyrene of each resin are shown in Table 3.

TABLE 3

Synthetic conditions and characteristics of urethane resins

| Urethane resin number | Polyol | | Amount (g) of dimethylolpropionic acid | Resin characteristics | |
| --- | --- | --- | --- | --- | --- |
| | Type | Amount (g) | | Acid value (mg KOH/g) | Weight-average molecular weight |
| 1 | PPG1000 | 39.3 | 13.2 | 55 | 20,000 |
| 2 | PPG1000 | 39.3 | 13.2 | 55 | 7,500 |
| 3 | PPG1000 | 39.3 | 13.2 | 55 | 8,000 |
| 4 | PPG1000 | 39.3 | 13.2 | 55 | 22,000 |
| 5 | PPG1000 | 39.3 | 13.2 | 55 | 22,500 |
| 6 | PPG1000 | 42.2 | 10.3 | 43 | 20,000 |
| 7 | PPG1000 | 41.7 | 10.8 | 45 | 20,000 |
| 8 | PPG1000 | 35.7 | 16.8 | 70 | 20,000 |
| 9 | PPG1000 | 34.5 | 18.0 | 75 | 20,000 |
| 10 | PTMG2000 | 39.3 | 13.2 | 55 | 15,000 |
| 11 | PEG1000 | 39.3 | 13.2 | 55 | 15,000 |

Preparation of Ink

The components (unit: %) shown in the upper part in Table 4 were mixed and thoroughly stirred, and the resulting mixture was subjected to pressure filtration through a cellulose acetate filter with a pore size of 0.8 μm (manufactured by ADVANTEC Co.), giving each ink. The numerical values attached to the polyethylene glycols represent number-average molecular weights. The dielectric constants of water-soluble organic solvents shown in the parentheses are values determined by using a dielectric constant meter (trade name "BI-870", manufactured by BROOKHAVEN INSTRUMENTS CORPORATION Co.), and the values of water-soluble organic solvents solid at 25° C. are values calculated in accordance with Expression (A). In the lower part in Table 4, the content p (%) of the pigment, the content a (%) of the water-soluble organic solvent A, the content b (%) of the water-soluble organic solvent B, the content c (%) of the water-soluble organic solvent C, and the content f (%) of the fluorinated surfactant are indicated. In the lower part in Table 4, the a/p value, the b/a value, the c/a value, and the b/f value are also indicated. The details of the components used are shown below.

Aqueous solution of acrylic resin 1: an aqueous solution having a resin content (solid content) of 20.0%, prepared by neutralizing and dissolving a water-soluble acrylic resin (trade name "Joncryl 678", manufactured by BASF Co.) having an acid value of 215 mg KOH/g and a weight-average molecular weight of 8,500 with potassium hydroxide in such an amount as to be 0.95 equivalent of the acid value Surfactant 1: a perfluoroalkyl ethylene oxide adduct having a perfluoroalkyl group (linear) with six carbon atoms (trade name "MEGAFACE F-444", manufactured by DIC Co.)

Surfactant 2: a perfluoroalkyl ethylene oxide adduct having a perfluoroalkyl group (linear) with six carbon atoms (trade name "ZONYL FSO-100", manufactured by Du Pont Co.)

Surfactant 3: a perfluoroalkyl carboxylate (trade name "MEGAFACE F-410", manufactured by DIC Co.)

Surfactant 4: a silicone-containing surfactant (trade name "BYK-348", manufactured by BYK Japan Co.)

Surfactant 5: a perfluoroalkyl ethylene oxide adduct having a perfluoroalkyl group with eight carbon atoms (trade name "FSO-100", manufactured by Du Pont Co.)

Antiseptic agent: trade name "Proxel GXL" (manufactured by Arch Chemicals Co.)

TABLE 4

Compositions and characteristics of inks

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Pigment dispersion liquid number | 1 | 2 | 3 | 4 | 5 | 6 | 7 | 8 | 9 | 10 | 1 | 1 | 1 | 1 | 1 | 1 |
| Urethane resin number | 1 | 1 | 1 | 1 | 1 | 1 | 1 | 1 | 1 | 1 | 1 | 1 | 1 | 1 | 1 | 1 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of urethane resin | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Aqueous solution of acrylic resin 1 | | | | | | | | | | | | | | | | |
| Surfactant 1 | 0.05 | 0.05 | 0.05 | 0.05 | 0.05 | 0.05 | 0.05 | 0.05 | 0.05 | 0.05 | | | 0.05 | 0.05 | 0.05 | 0.05 |
| Surfactant 2 | | | | | | | | | | | 0.05 | | | | | |
| Surfactant 3 | | | | | | | | | | | | 0.05 | | | | |
| Surfactant 4 | | | | | | | | | | | | | | | | |
| Surfactant 5 | | | | | | | | | | | | | | | | |
| Urea (110.3) | | | | | | | | | | | | | | | | |
| Ethylene urea (49.7) | 10.00 | 10.00 | 10.00 | 10.00 | 10.00 | 10.00 | 10.00 | 10.00 | 10.00 | 10.00 | 10.00 | 10.00 | 10.00 | | | 10.00 |
| Glycerol (42.3) | | | | | | | | | | | | | | 10.00 | | |
| Ethylene glycol (40.4) | | | | | | | | | | | | | | | 10.00 | |
| Trimethylolpropane (33.7) | | | | | | | | | | | | | | | | |
| Triethanolamine (31.9) | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 |
| 2-Pyrrolidone (28.0) | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethylene glycol (22.7) | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Isopropyl alcohol (18.3) | | | | | | | | | | | | | | | | |
| 1,2-Hexanediol (14.8) | 4.00 | 4.00 | 4.00 | 4.00 | 4.00 | 4.00 | 4.00 | 4.00 | 4.00 | 4.00 | 4.00 | 4.00 | 4.00 | 4.00 | | 4.00 |
| Polyethylene glycol 600 (11.4) | | | | | | | | | | | | | | | 4.00 | |
| Triethylene glycol monobutyl ether (9.8) | | | | | | | | | | | | | | | | |
| 1,6-Hexanediol (7.1) | | | | | | | | | | | | | | | | |
| Polyethylene glycol 1000 (4.6) | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Antiseptic agent | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 49.45 | 49.45 | 49.45 | 49.45 | 49.45 | 49.45 | 49.45 | 49.45 | 49.45 | 49.45 | 49.45 | 49.45 | 49.45 | 49.45 | 49.45 | 49.45 |
| Content p (%) of pigment | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| Content a (%) of water-soluble organic solvent A | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Content b (%) of water-soluble organic solvent B | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Content c (%) of water-soluble organic solvent C | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Content f (%) of fluorinated surfactant | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| a/p value (times) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| b/a value (times) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| c/a value (times) | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| b/f value (times) | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

| | Example | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Pigment dispersion liquid number | 1 | 1 | 1 | 1 | 1 | 1 | 1 | 1 | 1 | 11 | 12 | 13 | 14 | 1 | 1 | 1 |
| Urethane resin number | 1 | 1 | 1 | 1 | 1 | 1 | 1 | 1 | 1 | 1 | 1 | 1 | 1 | 1 | 1 | 1 |
| Pigment dispersion liquid | 20.00 | 20.00 | 20.00 | 20.00 | 20.00 | 50.00 | 20.00 | 20.00 | 20.00 | 20.00 | 20.00 | 20.00 | 20.00 | 20.00 | 20.00 | 20.00 |
| Aqueous solution of urethane resin | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Aqueous solution of acrylic resin 1 | | | | | | | | | | | | | | | | |

TABLE 4-continued

Compositions and characteristics of inks

| | Example 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| Surfactant 1 | 0.05 | 0.05 | | | | | | | | | | | | | | |
| Surfactant 2 | | | 0.05 | | | | | | | | | | | | | |
| Surfactant 3 | | | | 0.05 | | | | | | | | | | | | |
| Surfactant 4 | | | | | 0.05 | | | | | | | | | | | |
| Surfactant 5 | | | | | | 0.05 | 0.02 | 0.06 | 0.50 | 0.05 | 0.05 | 0.05 | 0.05 | 0.05 | 0.05 | 0.05 |
| Urea (110.3) | | | | | | | | | | | | | | | | |
| Ethylene urea (49.7) | 10.00 | 10.00 | 10.00 | 10.00 | 10.00 | 25.00 | 4.00 | 10.00 | 10.00 | 10.00 | 10.00 | 10.00 | 10.00 | 10.00 | 10.00 | 10.00 |
| Glycerol (42.3) | | | | | | | | | | | | | | | | |
| Ethylene glycol (40.4) | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 |
| Trimethylolpropane (33.7) | 5.00 | 5.00 | 5.00 | 5.00 | 5.00 | | 11.00 | 4.00 | 5.00 | 5.00 | 5.00 | 5.00 | 5.00 | 5.00 | 5.00 | 5.00 |
| Triethanolamine (31.9) | 5.00 | 5.00 | 5.00 | 5.00 | 5.00 | | 5.00 | 5.00 | 5.00 | 5.00 | 5.00 | 5.00 | 5.00 | 5.00 | 5.00 | 5.00 |
| 2-Pyrrolidone (28.0) | | | | | | | | | | | | | | | | |
| Triethylene glycol (22.7) | | | | | | 10.00 | 1.60 | 5.00 | | | | | | | | |
| Isopropyl alcohol (18.3) | | | | | | | | | | | | | | | | |
| 1,2-Hexanediol (14.8) | | | | 4.00 | 4.00 | 2.50 | 0.40 | 1.00 | 1.00 | 1.00 | 1.00 | 1.00 | 1.00 | 0.20 | 2.00 | 1.00 |
| Polyethylene glycol 600 (11.4) | 2.00 | | | 1.00 | 1.00 | 0.20 | 0.20 | 0.20 | 0.20 | 0.20 | 0.20 | 0.20 | 0.20 | 49.45 | 49.45 | 0.20 |
| Triethylene glycol monobutyl ether (9.8) | | 2.00 | | | | 6.95 | 52.48 | 49.44 | 49.00 | 49.45 | 49.45 | 49.45 | 49.45 | 2.00 | 2.00 | 49.45 |
| 1,6-Hexanediol (7.1) | | | 2.00 | | | 5.00 | 2.00 | 2.00 | 2.00 | 2.00 | 2.00 | 2.00 | 2.00 | 10.00 | 10.00 | 2.00 |
| Polyethylene glycol 1000 (4.6) | | | | | | 25.00 | 4.00 | 10.00 | 10.00 | 10.00 | 10.00 | 10.00 | 10.00 | 5.00 | 5.00 | 10.00 |
| Antiseptic agent | 0.20 | 0.20 | 0.20 | 0.20 | 0.20 | 12.50 | 2.00 | 6.00 | 5.00 | 5.00 | 5.00 | 5.00 | 5.00 | 0.00 | 2.00 | 5.00 |
| Ion-exchanged water | 52.45 | 52.45 | 52.45 | 49.45 | 49.45 | 2.50 | 0.40 | 1.00 | 1.00 | 1.00 | 1.00 | 1.00 | 1.00 | 0.05 | 5.00 | 3.00 |
| Content p (%) of pigment | 2.00 | 2.00 | 2.00 | 2.00 | 2.00 | 0.05 | 0.02 | 0.06 | 0.50 | 0.05 | 0.05 | 0.05 | 0.05 | 5.0 | 0.5 | 0.05 |
| Content a (%) of water-soluble organic solvent A | 10.00 | 10.00 | 10.00 | 10.00 | 10.00 | 5.0 | 2.0 | 5.0 | 5.0 | 5.0 | 5.0 | 5.0 | 5.0 | 0.5 | 0.5 | 5.0 |
| Content b (%) of water-soluble organic solvent B | 2.00 | 2.00 | 2.00 | 2.00 | 2.00 | 0.5 | 0.5 | 0.6 | 0.5 | 0.5 | 0.5 | 0.5 | 0.5 | 0.20 | 0.20 | 0.5 |
| Content c (%) of water-soluble organic solvent C | 2.00 | 2.00 | 2.00 | 2.00 | 2.00 | 0.10 | 0.10 | 0.10 | 0.10 | 0.10 | 0.10 | 0.10 | 0.10 | 100.0 | 100.0 | 0.30 |
| Content f (%) of fluorinated surfactant | 0.05 | 0.05 | 0.05 | 0.05 | 0.05 | | | | | | | | | | | |
| a/p value (times) | 5.0 | 5.0 | 5.0 | 5.0 | 5.0 | | | | | | | | | | | |
| b/a value (times) | 0.2 | 0.2 | 0.2 | 0.5 | 0.5 | | | | | | | | | | | |
| c/a value (times) | 0.20 | 0.20 | 0.20 | 0.10 | 0.10 | | | | | | | | | | | |
| b/f value (times) | 40.0 | 40.0 | 40.0 | 100.0 | 100.0 | 250.0 | 100.0 | 10.0 | 100.0 | 100.0 | 100.0 | 100.0 | 100.0 | 100.0 | 100.0 | 100.0 |
| Pigment dispersion liquid number | 1 | 1 | 1 | 1 | 1 | 1 | 1 | 1 | 1 | 1 | 1 | 1 | 1 | 1 | 1 | 1 |
| Urethane resin number | — | 2 | 3 | 4 | 5 | 6 | 7 | 8 | 9 | 10 | 11 | 1 | 1 | 1 | 1 | 1 |
| Pigment dispersion liquid | 20.00 | 20.00 | 20.00 | 20.00 | 20.00 | 20.00 | 20.00 | 20.00 | 20.00 | 20.00 | 20.00 | 1 | 1 | 0.50 | 20.00 | 20.00 |
| Aqueous solution of urethane resin | 0.00 | 5.00 | 5.00 | 5.00 | 5.00 | 5.00 | 5.00 | 5.00 | 5.00 | 5.00 | 5.00 | 10.00 | 1.00 | 5.00 | 5.00 | 5.00 |
| Aqueous solution of acrylic resin 1 | 2.50 | | | | | | | | | | | 5.00 | 5.00 | | | |
| Surfactant 1 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Surfactant 2 | | | | | | | | | | | | | | | | |
| Surfactant 3 | | | | | | | | | | | | | | | | |
| Surfactant 4 | | | | | | | | | | | | | | | | |
| Surfactant 5 | | | | | | | | | | | | | | | | |
| Urea (110.3) | | | | | | | | | | | | | | | | |
| Ethylene urea (49.7) | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Glycerol (42.3) | | | | | | | | | | | | | | | | |
| Ethylene glycol (40.4) | | | | | | | | | | | | | | | | |
| Trimethylolpropane (33.7) | | | | | | | | | | | | | | | | |
| Triethanolamine (31.9) | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 |

TABLE 4-continued

Compositions and characteristics of inks

| | Example | | Reference Example | | | | Comparative Example | | | | | | | | | |
|---|---|---|---|---|---|---|---|---|---|---|---|---|---|---|---|---|
| | 49 | 50 | 1 | 2 | 3 | 4 | 1 | 2 | 3 | 4 | 5 | 6 | 7 | 8 | 9 | 10 |
| 2-Pyrrolidone (28.0) | 5.00 | 5.00 | 5.00 | 5.00 | 5.00 | 5.00 | 5.00 | 5.00 | 5.00 | 5.00 | 5.00 | 5.00 | 5.00 | 5.00 | 9.00 | 0.00 |
| Triethylene glycol (22.7) | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Isopropyl alcohol (18.3) | | | | | | | | | | | | | | | | |
| 1,2-Hexanediol (14.8) | 4.00 | 4.00 | 4.00 | 4.00 | 4.00 | 4.00 | 4.00 | 4.00 | 4.00 | 4.00 | 4.00 | 4.00 | 4.00 | 4.00 | | 4.00 |
| Polyethylene glycol 600 (11.4) | | | | | | | | | | | | | | | | |
| Triethylene glycol monobutyl ether (9.8) | | | | | | | | | | | | | | | | |
| 1,6-Hexanediol (7.1) | | | | | | | | | | | | | | | | |
| Polyethylene glycol 1000 (4.6) | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 2.00 |
| Antiseptic agent | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 51.95 | 54.45 | 49.45 | 49.45 | 49.45 | 49.45 | 49.45 | 49.45 | 49.45 | 49.50 | 49.45 | 59.45 | 68.45 | 68.95 | 49.45 | 53.45 |
| Content p (%) of pigment | 2.00 | 2.00 | 2.00 | 2.00 | 2.00 | 2.00 | 2.00 | 2.00 | 2.00 | 2.00 | 2.00 | 1.00 | 0.10 | 0.05 | 2.00 | 2.00 |
| Content a (%) of water-soluble organic solvent A | 10.00 | | 10.00 | 10.00 | 10.00 | 10.00 | 10.00 | 10.00 | 10.00 | 10.00 | 10.00 | 10.00 | 10.00 | 10.00 | 10.00 | 10.00 |
| Content b (%) of water-soluble organic solvent B | 5.00 | | 5.00 | 5.00 | 5.00 | 5.00 | 5.00 | 5.00 | 5.00 | 5.00 | 5.00 | 5.00 | 5.00 | 5.00 | 10.00 | 6.00 |
| Content c (%) of water-soluble organic solvent C | 1.00 | | 1.00 | 1.00 | 1.00 | 1.00 | 1.00 | 1.00 | 1.00 | 1.00 | 1.00 | 1.00 | 1.00 | 1.00 | 1.00 | 2.00 |
| Content f (%) of fluorinated surfactant | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| a/p value (times) | 5.0 | | 5.0 | 5.0 | 5.0 | 5.0 | 5.0 | 5.0 | 5.0 | 5.0 | 5.0 | 10.0 | 100.0 | 200.0 | 5.0 | 5.0 |
| b/a value (times) | 0.5 | | 0.5 | 0.5 | 0.5 | 0.5 | 0.5 | 0.5 | 0.5 | 0.5 | 0.5 | 0.5 | 0.5 | 0.5 | 0.1 | 0.6 |
| c/a value (times) | 0.10 | | 0.10 | 0.10 | 0.10 | 0.10 | 0.10 | 0.10 | 0.10 | 0.10 | 0.10 | 0.10 | 0.10 | 0.10 | 0.10 | 0.20 |
| b/f value (times) | 100.0 | | 100.0 | 100.0 | 100.0 | 100.0 | 100.0 | 100.0 | 100.0 | 100.0 | 100.0 | 100.0 | 100.0 | 200.0 | 20.0 | 120.0 |

| | Example | | Reference Example | | | | Comparative Example | | | | | | | | | |
|---|---|---|---|---|---|---|---|---|---|---|---|---|---|---|---|---|
| | 49 | 50 | 1 | 2 | 3 | 4 | 1 | 2 | 3 | 4 | 5 | 6 | 7 | 8 | 9 | 10 |
| Pigment dispersion liquid number | 1 | 11 | 18 | 18 | 19 | 19 | 15 | 16 | 17 | 1 | 1 | 1 | 1 | 1 | 1 | 1 |
| Urethane resin number | 1 | — | 1 | 1 | 1 | 1 | 1 | 1 | 1 | 1 | 1 | 1 | 1 | 1 | 1 | 1 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of urethane resin | 5.00 | 0.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Aqueous solution of acrylic resin 1 | 0.05 | 0.05 | 0.05 | 0.05 | 0.05 | 0.05 | 0.05 | 0.05 | 0.05 | | | | | | 0.05 | 0.05 |
| Surfactant 1 | | | | | | | | | | | | | | | | |
| Surfactant 2 | | | | | | | | | | | 0.05 | | | | | |
| Surfactant 3 | | | | | | | | | | | | 0.30 | | | | |
| Surfactant 4 | | | | | | | | | | | | | 0.05 | | | |
| Surfactant 5 | | | | | | | | | | | | | | 0.05 | | |
| Urea (110.3) | | | | | | | | | | | | | | | | |
| Ethylene urea (49.7) | 10.00 | 10.00 | 10.00 | | 10.00 | | | | 10.00 | 10.00 | 10.00 | 10.00 | 10.00 | 10.00 | | 10.00 |
| Glycerol (42.3) | | | | | | | | | | | | | | | | |
| Ethylene glycol (40.4) | | | | | | | | | | | | | | | | |
| Trimethylolpropane (33.7) | | | | | | | | | | | | | | | | |
| Triethanolamine (31.9) | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 |
| 2-Pyrrolidone (28.0) | 5.00 | 5.00 | 5.00 | 15.00 | 5.00 | 15.00 | 5.00 | 5.00 | 5.00 | 5.00 | 5.00 | 0.00 | 5.00 | 5.00 | 15.00 | 5.00 |
| Triethylene glycol (22.7) | 5.00 | 5.00 | 5.00 | 5.00 | 5.00 | 5.00 | 5.00 | 5.00 | 5.00 | 5.00 | 5.00 | 0.00 | 5.00 | 5.00 | 5.00 | 5.00 |
| Isopropyl alcohol (18.3) | | | | | | | | | | | | | | | | |
| 1,2-Hexanediol (14.8) | 4.90 | 5.00 | 4.00 | 4.00 | 4.00 | 4.00 | 4.00 | 4.00 | 4.00 | 4.00 | 4.00 | 29.00 | 4.00 | 4.00 | 4.00 | 4.00 |
| Polyethylene glycol 600 (11.4) | 0.10 | | | | | | | | | | | | | | | |
| Triethylene glycol monobutyl ether (9.8) | | | | | | | | | | | | | | | | |
| 1,6-Hexanediol (7.1) | 0.20 | 0.20 | | | | | | | | | | | | | | |
| Polyethylene glycol 1000 (4.6) | | | 1.00 | 1.00 | 1.00 | 1.00 | 1.00 | 1.00 | 1.00 | 1.00 | 1.00 | 1.00 | 1.00 | 1.00 | 1.00 | 1.00 |
| Antiseptic agent | | | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 49.45 | 54.45 | 49.45 | 49.45 | 49.45 | 49.45 | 49.45 | 49.45 | 49.45 | 49.50 | 49.45 | 34.20 | 49.45 | 49.45 | 49.45 | 49.45 |
| Content p (%) of pigment | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |

TABLE 4-continued

Compositions and characteristics of inks

| | 11 | 12 | 13 | 14 | 15 | 16 | 17 | 18 | 19 | 20 | 21 |
|---|---|---|---|---|---|---|---|---|---|---|---|
| | | | | | | | Comparative Example | | | | |
| Pigment dispersion liquid number | 2 | 3 | 4 | 5 | 6 | 7 | 1 | 1 | 1 | 1 | 1 |
| Urethane resin number | 1 | 1 | 1 | 1 | 1 | 1 | 1 | 1 | 1 | 1 | 1 |
| Pigment dispersion liquid | 20.00 | 20.00 | 20.00 | 20.00 | 20.00 | 20.00 | 20.00 | 60.00 | 20.00 | 20.00 | 20.00 |
| Aqueous solution of urethane resin | 5.00 | 5.00 | 5.00 | 5.00 | 5.00 | 5.00 | 5.00 | 5.00 | 5.00 | 5.00 | 5.00 |
| Aqueous solution of acrylic resin 1 | | | | | | | | | | | |
| Surfactant 1 | 0.05 | 0.05 | 0.05 | 0.05 | 0.05 | 0.05 | 0.05 | 0.05 | 0.01 | 0.07 | 0.54 |
| Surfactant 2 | | | | | | | | | | | |
| Surfactant 3 | | | | | | | | | | | |
| Surfactant 4 | | | | | | | | | | | |
| Surfactant 5 | | | | | | | | | | | |
| Urea (110.3) | | | | | | | | | | | |
| Ethylene urea (49.7) | | | | | | | 10.00 | 12.00 | 2.00 | 10.00 | 10.00 |
| Glycerol (42.3) | | | | | | | | | | | |
| Ethylene glycol (40.4) | 0.30 | 0.30 | 0.30 | 0.30 | 0.30 | 0.30 | 0.30 | 0.30 | 0.30 | 0.30 | 0.30 |
| Trimethylolpropane (33.9) | 15.00 | 15.00 | 15.00 | 15.00 | 15.00 | 15.00 | 10.00 | 3.00 | 11.00 | 3.00 | 5.00 |
| Triethanolamine (31.9) | 5.00 | 5.00 | 5.00 | 5.00 | 5.00 | 5.00 | 5.00 | 5.00 | 11.00 | 5.00 | 5.00 |
| 2-Pyrrolidone (28.0) | | | | | | | | | | | |
| Triethylene glycol (22.7) | | | | | | | | | | | |
| Isopropyl alcohol (18.3) | 4.00 | 4.00 | 4.00 | 4.00 | 4.00 | 4.00 | | 4.00 | 0.80 | 6.00 | 4.00 |
| 1,2-Hexanediol (14.8) | | | | | | | | | | | |
| Polyethylene glycol 600 (11.4) | 1.00 | 1.00 | 1.00 | 1.00 | 1.00 | 1.00 | | 1.00 | 0.20 | 1.00 | 1.00 |
| Triethylene glycol monobutyl ether (9.8) | 0.20 | 0.20 | 0.20 | 0.20 | 0.20 | 0.20 | 0.20 | 0.20 | 0.20 | 0.20 | 0.20 |
| 1,6-Hexanediol (7.1) | | | | | | | | | | | |
| Polyethylene glycol 1000 (4.6) | | | | | | | | | | | |
| Antiseptic agent | 49.45 | 49.45 | 49.45 | 49.45 | 49.45 | 49.45 | 49.45 | 9.45 | 49.49 | 49.43 | 48.96 |
| Ion-exchanged water | 2.00 | 2.00 | 2.00 | 2.00 | 2.00 | 2.00 | 2.00 | 6.00 | 2.00 | 2.00 | 2.00 |
| Content p (%) of pigment | 0.00 | 0.00 | 0.00 | 0.00 | 0.00 | 0.00 | 10.00 | 12.00 | 2.00 | 10.00 | 10.00 |
| Content a (%) of water-soluble organic solvent A | 5.00 | 5.00 | 5.00 | 5.00 | 5.00 | 5.00 | 0.00 | 5.00 | 1.00 | 7.00 | 5.00 |
| Content b (%) of water-soluble organic solvent B | 1.00 | 1.00 | 1.00 | 1.00 | 1.00 | 1.00 | 0.00 | 1.00 | 0.20 | 1.00 | 1.00 |
| Content c (%) of water-soluble organic solvent C | 0.05 | 0.05 | 0.05 | 0.05 | 0.05 | 0.05 | 0.05 | 0.05 | 0.01 | 0.07 | 0.54 |
| Content f (%) of fluorinated surfactant | 0.0 | 0.0 | 0.0 | 0.0 | 0.0 | 0.0 | 0.0 | 2.0 | 1.0 | 5.0 | 5.0 |
| a/p value (times) | — | — | — | — | — | — | 5.0 | 0.4 | 0.5 | 0.7 | 0.5 |
| b/a value (times) | — | — | — | — | — | — | 0.0 | 0.08 | 0.10 | 0.10 | 0.10 |
| c/a value (times) | — | — | — | — | — | — | 0.0 | 100.0 | 100.0 | 100.0 | 9.3 |
| b/f value (times) | 100.0 | 100.0 | 100.0 | 100.0 | 100.0 | 100.0 | 0.0 | | | | |

Evaluation

In the present invention, a sample evaluated as "AA", "A", or "B" was regarded as an acceptable level, and a sample evaluated as "C" was regarded as an unacceptable level based on the following criteria. The evaluation results are shown in Table 5.

Gloss Clarity

The prepared ink was filled in an ink cartridge, and the ink cartridge was installed in an ink jet recording apparatus equipped with a recording head that ejects inks by thermal energy (trade name "PIXUS Pro 9500", manufactured by Canon Co.). With the ink jet recording apparatus, the image recorded in conditions in which eight ink drops each having a weight of 3.5 ng are applied to a unit area of 1/600 inch×1/600 inch at a resolution of 600 dpi×600 dpi is defined as a recording duty of 100%. Each ink prepared was used, and fifteen solid images were recorded on each of four types of glossy papers at a recording duty ranging from 10 to 150% with an increment of 10% in an eight-pass manner. As the four types of glossy papers, commercial products available under the trade names "PT-101", "PT-201", and "GL-101" (manufactured by Canon Co.) and "CRISPIA" (manufactured by Epson Co.) were used. Solid images at a recording duty of 100% were evaluated in the following manner. Two fluorescent lights disposed at an interval of 10 cm were used as observation light sources and were projected on the image 2 m apart. The shapes of the fluorescent lights projected on the image were visually observed in conditions of a lighting angle of 45 degrees and an observation angle of 45 degrees, and the gloss clarity of the image were evaluated based on the following criteria. Of the evaluations of the solid images recorded on the four types of glossy papers, the lowest evaluation was regarded as the evaluation result.

AA: The boundary between two projected fluorescent lights could be recognized, and the edges were not blurred.

A: The boundary between two projected fluorescent lights and the edges could be recognized, but the edges were slightly blurred.

B: The boundary between two projected fluorescent lights could be recognized, but the edges were so blurred as not to be recognized.

C: The boundary between two projected fluorescent lights could not be recognized.

Aggregation Suppression after Freezing

The particle size of the pigment in the prepared ink was determined (particle size before storage). Each ink was placed in a polytetrafluoroethylene container and the container was sealed. The container was stored in an environment of −30° C. for 14 days. The container was stored in a normal temperature environment for one day and the temperature was returned to normal temperature. The particle size of the pigment in the ink was then determined (particle size after storage). The particle size of the pigment was determined by using a particle size analyzer (trade name "ELS8000", manufactured by Otsuka Electronics Co.). Then, the particle sizes of the pigment in the ink before and after the storage were compared, and the aggregation suppression after freezing was evaluated based on the following criteria.

AA: The particle size of the pigment after storage was less than 1.1 times the particle size of the pigment before storage.

A: The particle size of the pigment after storage was 1.1 times or more to less than 1.2 times the particle size of the pigment before storage.

B: The particle size of the pigment after storage was 1.2 times or more to less than 1.3 times the particle size of the pigment before storage.

C: The particle size of the pigment after storage was 1.3 times or more the particle size of the pigment before storage.

TABLE 5

| | | Evaluation result | |
|---|---|---|---|
| | | Gloss clarity | Aggregation suppression after freezing |
| Example | 1 | AA | AA |
| | 2 | AA | AA |
| | 3 | AA | AA |
| | 4 | AA | AA |
| | 5 | AA | AA |
| | 6 | AA | AA |
| | 7 | AA | AA |
| | 8 | AA | AA |
| | 9 | AA | AA |
| | 10 | AA | AA |
| | 11 | AA | AA |
| | 12 | AA | AA |
| | 13 | AA | AA |
| | 14 | AA | AA |
| | 15 | AA | AA |
| | 16 | AA | AA |
| | 17 | AA | AA |
| | 18 | AA | AA |
| | 19 | AA | AA |
| | 20 | AA | AA |
| | 21 | AA | AA |
| | 22 | AA | AA |
| | 23 | AA | AA |
| | 24 | AA | AA |
| | 25 | AA | AA |
| | 26 | A | AA |
| | 27 | AA | AA |
| | 28 | AA | AA |
| | 29 | AA | A |
| | 30 | A | A |
| | 31 | AA | AA |
| | 32 | A | A |
| | 33 | A | A |
| | 34 | A | AA |
| | 35 | AA | AA |
| | 36 | AA | AA |
| | 37 | A | AA |
| | 38 | AA | A |
| | 39 | AA | AA |
| | 40 | AA | AA |
| | 41 | AA | A |
| | 42 | AA | AA |
| | 43 | AA | A |
| | 44 | AA | AA |
| | 45 | AA | AA |
| | 46 | AA | AA |
| | 47 | AA | AA |
| | 48 | AA | AA |
| | 49 | AA | AA |
| | 50 | B | B |
| Reference Example | 1 | AA | AA |
| | 2 | AA | AA |
| | 3 | AA | AA |
| | 4 | AA | AA |
| Comparative Example | 1 | A | C |
| | 2 | AA | C |
| | 3 | C | C |
| | 4 | C | A |
| | 5 | C | A |
| | 6 | A | C |
| | 7 | C | A |
| | 8 | C | A |
| | 9 | C | C |
| | 10 | C | C |
| | 11 | C | C |
| | 12 | C | C |
| | 13 | C | C |

TABLE 5-continued

Evaluation result

| | Gloss clarity | Aggregation suppression after freezing |
|---|---|---|
| 14 | C | C |
| 15 | C | C |
| 16 | C | C |
| 17 | C | A |
| 18 | C | AA |
| 19 | C | C |
| 20 | A | C |
| 21 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011095, filed Jan. 23, 2015, which is hereby incorporated by reference herein in its entirety.

What is claimed is:

1. An aqueous ink for ink jet comprising:
a pigment;
a resin dispersant for dispersing the pigment;
a fluorinated surfactant;
a water-soluble organic solvent; and
a water-soluble urethane resin,
wherein the pigment comprises at least one pigment selected from the group consisting of (a) quinacridone pigments, (b) quinacridone solid solution pigments formed from two or more of the quinacridone pigments, (c) diketopyrrolopyrrole pigments, and (d) C.I. Pigment Violet 23, wherein the quinacridone pigments comprise at least one pigment selected from the group consisting of C.I. Pigment Violet 19, C.I. Pigment Red 122, C.I. Pigment Red 202, and C.I. Pigment Red 209, and wherein the diketopyrrolopyrrole pigments comprise at least one pigment selected from the group consisting of C.I. Pigment Red 254, C.I. Pigment Red 255, and C.I. Pigment Red 272,
wherein the resin dispersant comprises a water-soluble acrylic resin and has an acid value of 150 mg KOH/g or more to 200 mg KOH/g or less,
wherein the fluorinated surfactant comprises a perfluoroalkyl ethylene oxide adduct having a perfluoroalkyl group with six or less carbon atoms,
wherein the water-soluble organic solvent comprises (i) a water-soluble organic solvent A having a dielectric constant of 40.0 or more and (ii) a water-soluble organic solvent B having a dielectric constant of 3.0 or more to 20.0 or less,
wherein a content p (% by mass) of the pigment is 5.00% by mass or less,
wherein a content a (% by mass) of the water-soluble organic solvent A relative to the content p (% by mass) of the pigment is 2.0 times or more in terms of mass ratio,
wherein a content b (% by mass) of the water-soluble organic solvent B relative to the content a (% by mass) of the water-soluble organic solvent A is 0.6 times or less in terms of mass ratio,
wherein the content b (% by mass) of the water-soluble organic solvent B relative to a content f (% by mass) of the fluorinated surfactant is 10.0 times or more in terms of mass ratio, and
wherein the water soluble urethane resin has an acid value of 45 mg KOH/g or more to 70 mg KOH/g or less.

2. The aqueous ink according to claim 1, wherein the content p (% by mass) of the pigment relative to a content d (% by mass) of the resin dispersant is 1.1 times or more to 10.0 times or less in terms of mass ratio.

3. The aqueous ink according to claim 1, wherein the water-soluble organic solvent B comprises a water-soluble organic solvent C having a dielectric constant of 3.0 or more to 10.0 or less, and a content c (% by mass) of the water-soluble organic solvent C relative to the content a (% by mass) of the water-soluble organic solvent A is 0.2 times or less in terms of mass ratio.

4. The aqueous ink according to claim 3, wherein a content c (% by mass) of the water-soluble organic solvent C in the ink is 0.10% by mass or more to 15.00% by mass or less based on the total mass of the ink.

5. The aqueous ink according to claim 3, wherein the water-soluble organic solvent C comprises polyethylene glycol having a number-average molecular weight of 1,000.

6. The aqueous ink according to claim 3, wherein the water-soluble organic solvent A comprises glycerol, the water-soluble organic solvent B comprises 1,2-hexanediol, and the water soluble organic solvent C comprises polyethylene glycol having a number-average molecular weight of 1,000.

7. The aqueous ink according to claim 1, wherein the water-soluble urethane resin has a weight-average molecular weight of 8,000 or more to 22,000 or less.

8. The aqueous ink according to claim 1, wherein the water-soluble urethane resin has a poly(oxytetramethylene) structure or a poly(oxypropylene) structure.

9. An ink cartridge comprising:
an ink; and
an ink storage portion for storing the ink,
wherein the ink comprises an aqueous ink for ink jet according to claim 1.

10. An ink jet recording method comprising:
ejecting an ink from an ink jet recording head to record an image on a recording medium,
wherein the ink comprises an aqueous ink for ink jet according to claim 1.

11. The aqueous ink according to claim 1, wherein a content p (% by mass) of the pigment in the ink is 0.05% by mass or more based on the total mass of the ink.

12. The aqueous ink according to claim 1, wherein a content d (% by mass) of the resin dispersant in the ink is 0.01% by mass or more to 5.00% by mass or less based on the total mass of the ink.

13. The aqueous ink according to claim 1, wherein a content f (% by mass) of the fluorinated surfactant in the ink is 0.01% by mass or more to 0.20% by mass or less based on the total mass of the ink.

14. The aqueous ink according to claim 1, wherein a content a (% by mass) of the water-soluble organic solvent A in the ink is 0.10% by mass or more to 50.00% by mass or less based on the total mass of the ink.

15. The aqueous ink according to claim 1, wherein a content b (% by mass) of the water-soluble organic solvent B in the ink is 0.10% by mass or more to 30.00% by mass or less based on the total mass of the ink.

16. The aqueous ink according to claim 1, wherein a content (% by mass) of the water-soluble urethane resin in the ink is 0.10% by mass or more to 3.00% by mass or less based on the total mass of the ink.

17. The aqueous ink according to claim 1, wherein the pigment comprises at least one pigment selected from the group consisting of (i) a solid solution formed from C.I. Pigment Violet 19 and C.I. Pigment Red 202, (ii) C.I. Pigment Red 254, and (iii) C.I. Pigment Violet 23.

18. The aqueous ink according to claim 1, wherein the water-soluble organic solvent A comprises glycerol.

19. The aqueous ink according to claim 1, wherein the water-soluble organic solvent B comprises at least one of 1,2-hexanediol and polyethylene glycol having a number-average molecular weight of 1,000.

20. The aqueous ink according to claim 1, wherein the water-soluble organic solvent A comprises glycerol and the water-soluble organic solvent B comprises at least one of 1,2-hexanediol and polyethylene glycol having a number-average molecular weight of 1,000.

* * * * *